United States Patent
Monni et al.

(10) Patent No.: US 11,533,337 B2
(45) Date of Patent: Dec. 20, 2022

(54) MULP: A MULTI-LAYER APPROACH TO ACL PRUNING

(71) Applicant: salesforce.com, Inc., San Francisco, CA (US)

(72) Inventors: Gianstefano Monni, Dublin (IE); Alvaro Caso, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 246 days.

(21) Appl. No.: 16/866,651

(22) Filed: May 5, 2020

(65) Prior Publication Data

US 2021/0352107 A1 Nov. 11, 2021

(51) Int. Cl.
*H04L 29/06* (2006.01)
*H04L 9/40* (2022.01)

(52) U.S. Cl.
CPC .......... *H04L 63/20* (2013.01); *H04L 63/0263* (2013.01); *H04L 63/101* (2013.01); *H04L 63/166* (2013.01)

(58) Field of Classification Search
CPC ... H04L 63/20; H04L 63/0263; H04L 63/101; H04L 63/166
See application file for complete search history.

(56) References Cited

U.S. PATENT DOCUMENTS

| | | | |
|---|---|---|---|
| 6,216,133 B1 * | 4/2001 | Masthoff | G06F 16/338 707/E17.093 |
| 9,294,366 B2 * | 3/2016 | Mahimkar | H04L 43/12 |
| 2004/0064727 A1 * | 4/2004 | Yadav | H04L 63/0227 726/1 |
| 2010/0222081 A1 * | 9/2010 | Ward | H04W 4/029 455/456.3 |
| 2012/0215893 A1 * | 8/2012 | Bisdikian | G06F 9/5011 709/223 |
| 2013/0028114 A1 * | 1/2013 | Gutierrez, Jr. | G06Q 10/10 370/252 |
| 2013/0031120 A1 * | 1/2013 | Passani | G06F 16/9577 707/758 |
| 2013/0117842 A1 * | 5/2013 | Kakadia | H04W 24/08 370/252 |
| 2013/0138816 A1 * | 5/2013 | Kuo | G06F 9/5011 709/226 |
| 2015/0149613 A1 * | 5/2015 | Kakadia | H04L 41/142 709/224 |
| 2018/0278648 A1 * | 9/2018 | Li | G06F 21/552 |

OTHER PUBLICATIONS

Link Prediction on Evolving Data Using Tensor-based Common Neighbor, Cui et al, p. 343-346. (Year: 2012).*

* cited by examiner

*Primary Examiner* — Yonas A Bayou

(57) ABSTRACT

Disclosed embodiments are a computing system and a computer-implemented method related to minimizing the number of rules/policies needed to be stored to enforce those rules/policies. The minimizing comprising generating adjacency data structures mapping as adjacent pairs of network nodes, which are allowed to communicate with one another according to the plurality rules, and applying them for pruning the rule dataset. This allows an original set of rules/policies to be reduced into a smaller set, which conserves computational resources.

18 Claims, 16 Drawing Sheets

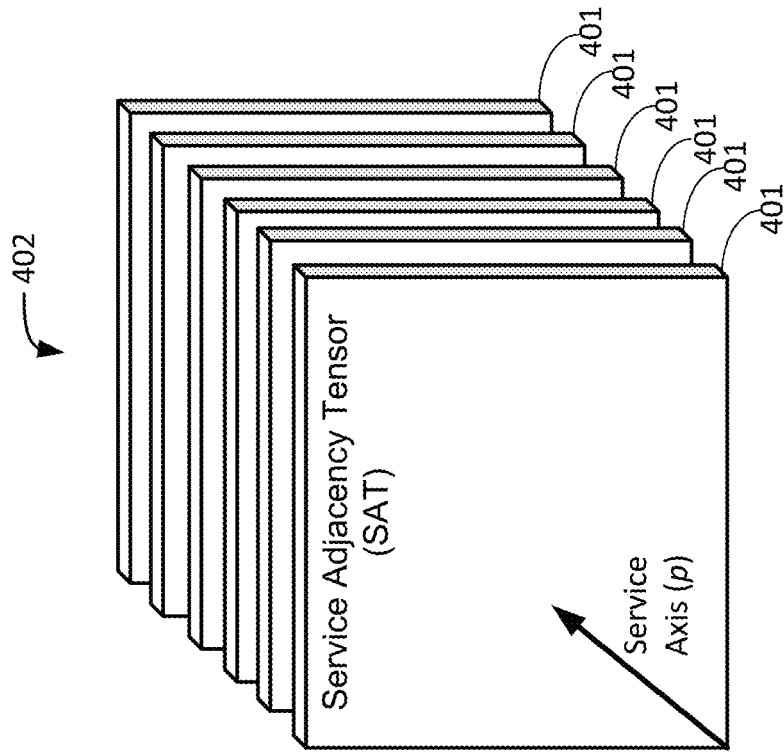
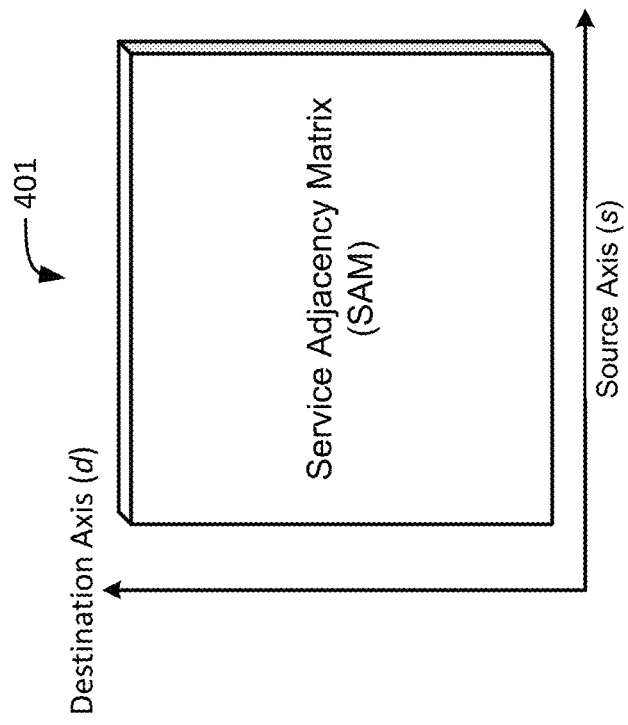
FIG.4

1110

```
my_acl = np.transpose(self, acl_rules)
self.SAT[:] = 0
self.SAT[my_acl[0], my_acl[1], my_acl[2]] = SAT_MAXVAL
```

1120

```
self.__conj_SAT = np.empty(((1, self.networks_cnt, self.networks_cnt
)), dtype=SAT_DATATYPE)
self.__conj_SAT[0,:] = SAT_MAXVAL for rule in ACL:
    rule_src_id = rule[0]
    rule_dst_id = rule[1]
    src_net = str(self.__node2net[rule_src_id])
    all_src_lst = self.__NRT.search_covered(src_net)
    dst_net = str(self.__node2net[rule_dst_id])
    all_dst_lst = self.__NRT.search_covered(dst_net) for cur_src_node in
all_src_lst:
    cur_src_id = cur_src_node.data['id']
    for cur_dst_node in all_dst_lst:
        cur_dst_id = cur_dst_node.data['id']
        if cur_src_id != rule_src_id and cur_dst_id != rule_dst_id:
            self.__conj_SAT[0, cur_src_id, cur_dst_id] = 0
```

*FIG. 11*

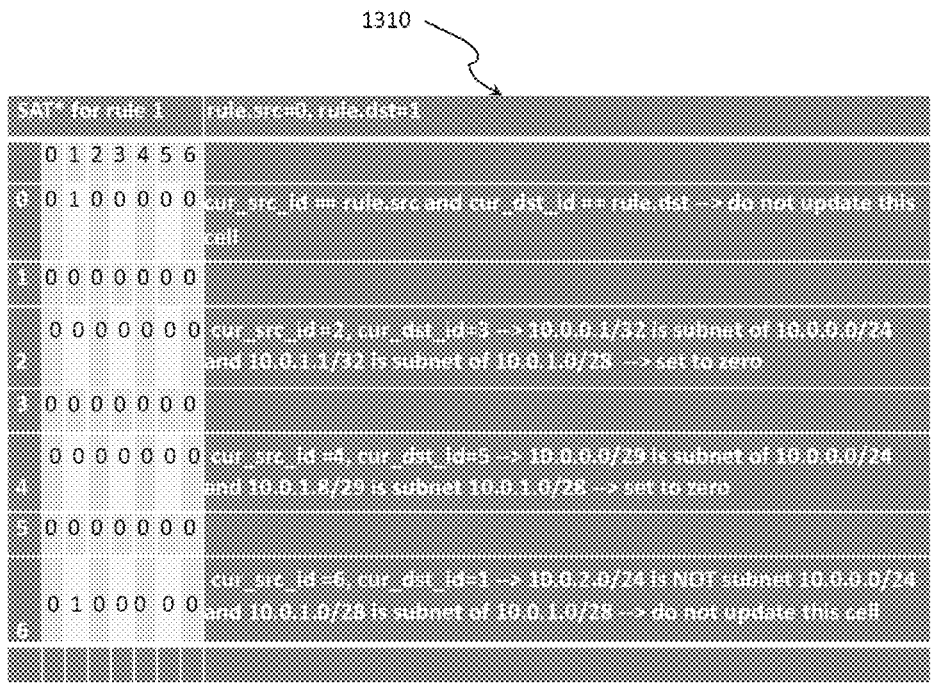
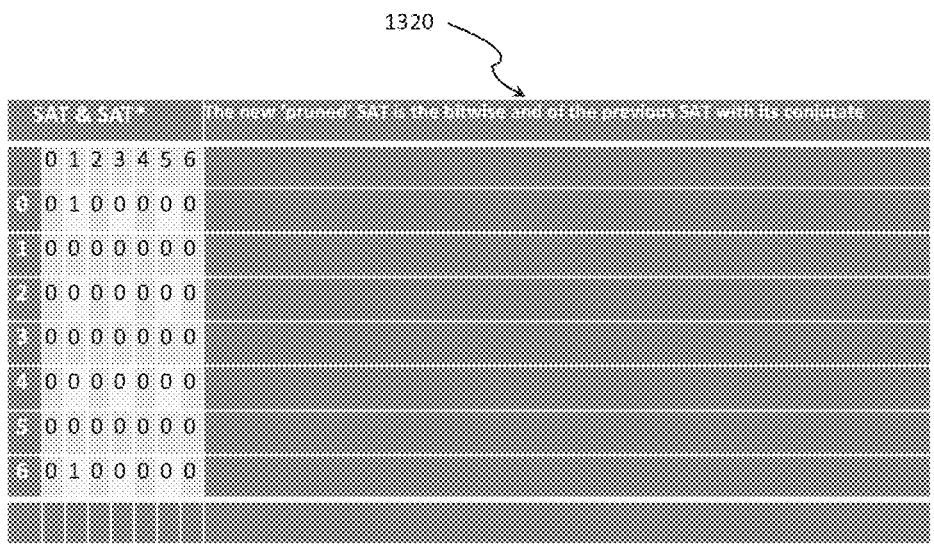
The new ruleset: [0,0,1],[0,6,1]]
and the corresponding ACL is:
1. 10.0.0.0/24 → 10.0.1.0/28
2. 10.0.2.0/24 → 10.0.1.0/28
FIG. 13

1410

```
for cur_svc in range(start_service, end_service):
    is_not_pruned = bool('Pruned' not in cur_service_node.data)
    If is_not_pruned:
        self.__create_conj(cur_svc)
        self.__SAT[cur_svc] = self.__SAT[cur_svc] & self.__conj_SAT[0]
```

1420

```
for parent in self.__SRT.search_covered('::/0'):
    parent_net = IPNetwork(parent.prefix).ip
    parent_dst_port_hi = parent_net.value >> 16 & 0xFFFF
    parent_dst_port_lo = parent_net.value >> 32 & 0xFFFF
    node_net = IPNetwork(str(parent_net) + '/80')
    cur_children = self.__stree.search_covered(str(node_net)) child_lst = []
    for child_node in cur_children:
        if child_n.prefix != parent.prefix :
            child_net = IPNetwork(child_node.prefix)
            child_dst_port_hi = child_net.value >> 16 & 0xFFFF
            child_dst_port_lo =    child_net.value >> 32 & 0xFFFF
            if child_dst_port_hi <= parent_dst_port_hi and
child_dst_port_lo >= parent_dst_port_lo: child_lst.append(child_node)
if len(child_lst) > 0 and 'services' in parent.data:
        parent_svc = parent.data['services'][0]
    self.__create_conj(parent_svc)
    for child in child_lst:
        child_svc = child.data['services'][0]
        self.SAT[child_svc]=self.SAT[child_svc]& self.conj_SAT[0]
```

```
****************************************************************
number of networks:                          17,886
number of services                           137
number of rules                              6,290,863
number of protocol-shadowed rules            143,680   ← Type "1"
number of overlapping-service shadowed rules 115,658   ← Type "2"
number of internal-shadowed rules            6,125     ←Type "3" Shadowing
Total number of shadowed rules               265,463
Shadow Size                                  4.22%
final number of rules                        6,025,400
****************************************************************
Total time: 43m48.698s
```

1520

```
****************************************************************
number of networks                           16,959
number of services                           130
number of rules                              6,388,778
number of protocol-shadowed rules            123,611
number of overlapping-service shadowed rules 301,550
number of internal-shadowed rules            11,564
number of shadowed rules                     436,725
Shadow Size                                  6.84%
final number of rules                        5,952,053
****************************************************************
Total time: 32m34.392ss  Pruned rules: 6.84%
```

FIG. 15

MULP: A MULTI-LAYER APPROACH TO ACL PRUNING

BACKGROUND

The present disclosure, in some embodiments thereof, relates to computer networks, and, more particularly, but not exclusively, network security, information security, compliance and auditing.

Many organizations operate private networks, which are also referred to as "intranets", "enterprise networks", or the likes. These networks may require various network policies, or rulesets to be enforced. The policies may be established and enforced for security purposes, regulatory compliance, auditing, and/or for internal organization-related purposes. Network policy enforcement involves making sure that only specific data flows are allowed in the network based on various rules defined by the network policy.

Network elements such as switches, routers, firewall computer appliances, and proxy servers may be owned or operated by the organizations. These elements store these policies or rulesets, and refer to the stored policies in order to filter out non-complying and/or suspicious network traffic. The size of these policies tends to increase, in terms of the number of rules per policy and the amount of memory required for storing the policies, as new rules are created and/or as existing rules are amended. Rules are added and amended based on increasing complexity in org-structure, increasing complexity and/or the addition of regulatory requirements, as well as new and/or more sophisticated security threats. The increasing size of network policies increases the use of computational resources needed to process the policies. This increased demand on computational and memory resources may cause bottlenecks or overload conditions to occur at the network elements thereby degrading the overall performance of the network. Furthermore, some of these rulesets may have to be stored on expensive context accessible memory (CAM).

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. These drawings in no way limit any changes in form and detail that may be made by one skilled in the art without departing from the spirit and scope of the disclosed implementations.

In the drawings:

FIG. 4 shows an example service adjacency matrix (SAM) and an example first adjacency data structure, a service adjacency tensor (SAT) according to some embodiments of the present disclosure;

FIG. 11 shows two exemplary code segments, used for the construction of the first adjacency data structure and the second adjacency data structure, according to some embodiments of the present disclosure;

FIG. 13 shows two exemplary tables of second adjacency data structure and its application, and a generated ruleset, according to some embodiments of the present disclosure;

FIG. 14 shows two exemplary code segments, used for the application of the second adjacency data structure and the application of the service radix tree in the construction of the second adjacency data structure, according to some embodiments of the present disclosure; and FIG. 15 shows two experiment results of a process for pruning the access control list, used for enforcing network security policies, according to an exemplary embodiment of the present disclosure.

DETAILED DESCRIPTION

Figure 1A:
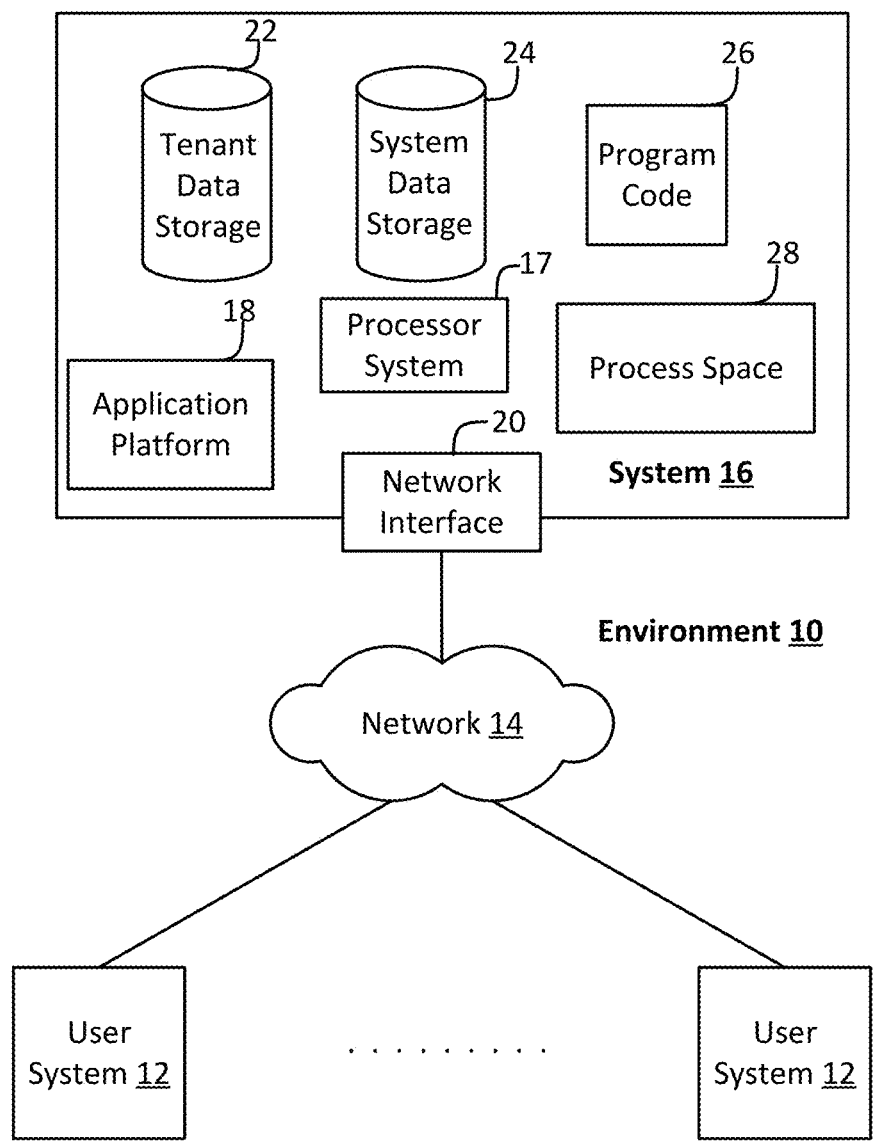
FIG. 1A shows an example environment in which an on-demand database service can be used according to some embodiments of the present disclosure.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to a computer networks and, more specifically, but not exclusively, to a network security, information security, compliance and auditing.

According to a first aspect of some embodiments of the present invention there is provided a computing system for enforcing network security policies, comprising: A memory storing a rule dataset comprising plurality of rules conditioning communication between a plurality of network nodes of a plurality of subnetworks; and A processor operable to:

generate a first adjacency data structure mapping as adjacent each pair of network nodes from the plurality of network nodes, which are allowed to communicate with one another according to the plurality rules, generate a second adjacency data structure mapping as adjacent each pair of network nodes, which are of a common subnetwork, detect at least one redundant rule from the plurality of subnetworks by applying the second adjacency data structure on the first adjacency data structure, and instruct removing the at least one redundant rule from the rule dataset.

According to a second aspect of some embodiments of the present invention there is provided a computer implemented method for enforcing network security policies, according to a rule dataset comprising plurality of rules conditioning communication between a plurality of network nodes of a plurality of subnetworks, the method comprising:

generating a first adjacency data structure mapping as adjacent each pair of network nodes from the plurality of network nodes, which are allowed to communicate with one another according to the plurality rules, generating a second adjacency data structure mapping as adjacent each pair of network nodes, which are of a common subnetwork, detecting at least one redundant rule from the plurality of subnetworks by applying the second adjacency data structure on the first adjacency data structure, and instructing removing the at least one redundant rule from the rule dataset.

According to a third aspect of some embodiments of the present invention there is provided one or more non-transitory computer-readable media (NTCRM) comprising instructions of enforcing network security policies, according to a rule dataset comprising plurality of rules conditioning communication between a plurality of network nodes of a plurality of subnetworks, wherein execution of the instructions by one or more processors of a computing system is to cause a computing system to:

generate a first adjacency data structure mapping as adjacent each pair of network nodes from the plurality of network nodes which are allowed to communicate with one another according to the plurality rules, generate a second adjacency data structure mapping as adjacent each pair of network nodes which are of a common subnetwork, detect at least one redundant rule from the plurality of subnetworks by applying the second adjacency data structure on the first adjacency data structure, and instruct removing the at least one redundant rule from the rule dataset.

Optionally, the at least one redundant rule allows at least one network node to communicate with at least one other network node, using an upper layer protocol (e.g. ICMP, TCP, UDP) service and at least one other rule allows the at least one network node to communicate with the at least one other network node using a lower layer protocol (e.g. IP) service.

Optionally, the at least one redundant rule allows at least one network node to communicate with at least one other network node, using a transport layer port range included in a transport layer port range of at least one other rule, allowing the at least one network node to communicate with the at least one other network node.

Optionally, the at least one redundant rule allows at least one network node to communicate with at least one other network node, and at least one other rule allows the common subnetwork comprising the at least one network node to communicate with the at least one other network node.

Optionally, the applying the second adjacency data structure on the first adjacency data structure is done by an elementwise operator, and the second adjacency data structure is based on a at least one hierarchical data structure, based on the plurality of subnetworks.

Optionally, the at least one hierarchical data structure is further based on a dictionary, containing indexed list of the plurality of network nodes and the plurality of subnetworks, represented in the plurality of rules.

Optionally, the at least one hierarchical data structure comprises at least one network radix tree wherein nodes comprise networks addresses of network nodes and masks.

Optionally, the applying the second adjacency data structure on the first adjacency data structure is done by an elementwise operator, and the second adjacency data structure is based on a service radix tree wherein nodes describe a plurality of services using a vector comprising Internet protocol (IP) options and at least one word selected from of upper layers protocol type, protocol options, source port numbers, and destination port numbers.

Optionally, the first adjacency data structure is a service adjacency tensor (SAT) in a three-dimensional (3D) space, the SAT comprising a plurality of vectors, each vector of the plurality of vectors represents respective rules for individual network nodes of a set of network nodes allowed to communicate in a network using one or more services.

Optionally, the second adjacency data structure being a slice in the service space of the SAT, and comprising a plurality of vectors, each vector of the plurality of vectors represents respective rules for the network nodes from the plurality of subnetworks to communicate in a network using the one or more services corresponding to the slice.

Optionally, the processor is operable to control enforcement of the network security policies.

Optionally, the processor is operable to: inspect one or more data packets received by the network interface; and permit forwarding of the one or more data packets if a source object indicated by the one or more data packets is permitted to: communicate with a destination object indicated by the one or more data packets.

Optionally, the computing system is a switch, a router, a gateway appliance, a firewall computer appliance, or a server computer system. Optionally, each of the respective rules comprises a source object that is allowed to communicate with a destination object using a service.

Optionally, the processor is further operable to generate a network service graph comprising a plurality of objects and edges representing communications between the plurality of objects using a service.

Optionally, each vector of the plurality of vectors represents a rule of a plurality of rules, and the plurality of rules belongs to corresponding network policies for communicating in a computer network.

Optionally, the processor comprises a plurality of entries, each entry comprising a source object from the set of objects and a destination object from the set of objects, and to generate the service adjacency tensor, and the processor is further operable to generate the service adjacency tensor such that individual entries the plurality of entries include a value of one if and only if a source object for the individual entries is allowed to communicate with a destination object for the individual entries using a given service.

Typically, network elements such as switches, routers, firewall computer appliances, proxy servers, and the like, store communication network policies in order to filter out non-complying and/or suspicious network traffic. However, the complexity in organization structure, complexity of regulatory requirements, as well as new and/or more sophisticated security threats may cause an increase in policy size (in terms of the number of rules per policy and the amount of resources needed to store and process the policies). The increasing size of network policies increases the use of storage resources, as well as the use computational resources needed to process the policies.

A detailed description of an implementation of an information security system, a database service environment, a service graph, and service adjacency data structures are discussed in U.S. patent application Ser. No. 16/506,724, titled "GROUP OPTIMIZATION FOR NETWORK COMMUNICATIONS", by Gianstefano Monni, which is hereby incorporated by reference in its entirety and for all purposes.

Computer networks communication may be based on packets, which may be characterized by the triplet: (source object, destination object, service). Source objects, which may be network nodes of a computer, a cellular device, a network device, a printer, or the like, may send a packet to a destination object, which may be a network node of a computer, a display device, a file server, or the like, using a service, which may be a high level application over a lower layer communication protocol such as Transmission Control Protocol (TCP) or User Datagram Protocol (UDP). Network devices such as routers may allow communication from some of the network nodes, to some other network nodes, using one or more services, in accordance with rules, regarding source, destination, and service, specified by one or more policies. Redundancies in the rulesets may accumulate and encumber known practices of applying an access control list (ACL) on computing networks. These redundancies may exacerbate latency and memory consumption, and cause network delays and failures.

The present disclosure involves pruning redundant rules from rulesets shared by different services and/or subnetworks, such as hierarchical subnetworks, reducing computational complexity of checking rules such as access rules for compliance while permitting forwarding the same data packets the larger rulesets would allow. The pruning is executed using data structures adapted to simplify detection of rules with overlapping coverage.

Radix tree(s) may be used to trace rules with overlapping coverage. A radix tree branching may be implemented using a descriptor or a vector, optionally binary, representing port ranges, protocol identifiers and protocol options (e.g. flags) from both transport and/or network layers. For example, the vector may comprise IP protocol options, transport layer protocol options, and/or transport layer port ranges for source(s) and destination(s). Some embodiments of the present disclosure further represent source and/or destination addresses in radix trees.

Optionally, one or more service adjacency maps (SAM(s)) and a service adjacency tensor (SAT) may be generated. The SAMs may be two-dimensional matrices, tables, or the likes, wherein one of the axes represent the source object, and the another axis represents the destination object with which the source object is allowed to communicate using one or more services. The SAT may comprise the same two axes and one or more additional axes, representing the service type.

To detect redundant rules, some embodiments of the present disclosure form an additional data structure, having the same axes and dimensions as the SAT, using the hierarchy represented in one or more of the radix trees to mark subnetworks and/or services, which may be allowed by another, more general, rule. The redundant rules may be detected by elementwise matching of the SAT and the additional data structure. Following the detection, some embodiments may instruct removing rules found redundant from the rule dataset. Alternatively, an embodiment may create a smaller set of rules and transmit it to network elements storing communication network policies.

Alternative embodiments may use graph theory to model and optimize the communications between objects, and reduce the size of these policies, which solves the above-mentioned problems. The embodiments may be applied to any set of objects that may communicate with one another, and are not limited to networking/firewall use cases discussed previously. In some embodiments of the present disclosure, a graph, a matrix, or a table is used to represent a set communication rules for one communication protocol or service. For example, one set of rules may pertain to email communications, and another set of rules may pertain to video telephony (e.g., Skype®, Zoom®, etc.). For example, a first graph, matrix, or table is used to represent the communication between objects using email, and a second graph, matrix, or table is used to represent the communication between objects using video telephony. These graphs, matrices, or tables are combined to create a tensor, which may be represented as a 3D matrix. Each point in the tensor is a vector representing a rule in 3D space. A rule comprises a source that is allowed to, or able to, communicate with a destination using a service (or communication protocol). Translation of rules from a 3D space to a list may be performed by extracting the non-zero elements from the simplified tensor into a matrix, and transposing this matrix to obtain a list of 3D vectors in the 3D space, where each 3D vector includes source, destination, and service components. These 3D vectors represent the reduced or compressed (optimal) ruleset. Additionally, depending on how the rulebase is further organized, the ruleset may be sorted in any combination of the tuple comprising protocol, source and destination components.

As used herein, the term tenant refers to one or more users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom may be recognized as enterprise users.

One example of an online enterprise social network is Chatter®, provided by salesforce(dot)com, Inc. of San Francisco, Calif. Salesforce(dot)com, Inc. is a provider of enterprise social networking services, customer relationship management (CRM) services and other database management services, any of which may be accessed and used in conjunction with the techniques disclosed herein in some implementations. These various services may be provided in a cloud-computing environment as described herein, for example, in the context of a multi-tenant database system. Some of the described techniques or processes may be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce(dot)com, Inc. and may be implemented in the context of various other database systems such as cloud-based systems that are not part of a multi-tenant database system or which do not provide enterprise social networking services.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The non-transitory computer-readable media may be one or more tangible devices that may retain and store instructions for use by an instruction execution device. Computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a remote web or cloud service, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including a scripting language such as Python or Perl, an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

FIG. 1A shows an example of an environment 10 in which on-demand services (e.g., cloud computing services and/or database services) may be used in accordance with some embodiments of the present disclosure. The environment 10 includes user systems 12, a network 14, and system 16 (also referred to herein as a "cloud-based system," "database system," "cloud computing service," or the like). The cloud system 16 includes a processor system 17, an application platform 18, a network interface 20, tenant database 22 for storing tenant data 23 (see FIG. 1B), system database 24 for storing system data 25 (see FIG. 1B), program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

Figure 1B:
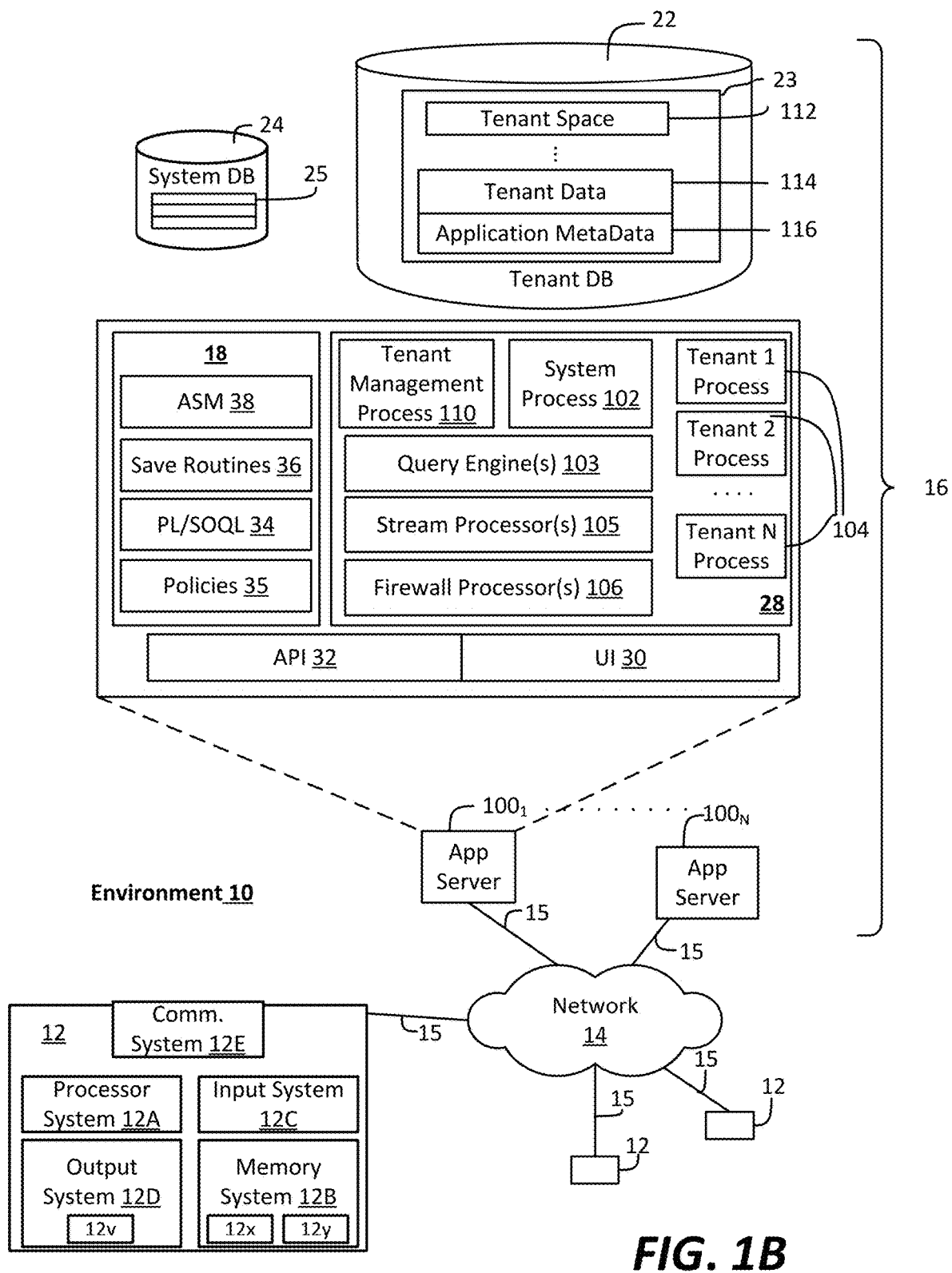
FIG. 1B shows an example implementation of elements of FIG. 1A and example interconnections between these elements according to some embodiments of the present disclosure.

The system 16 may be a database system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant database system and/or a multi-tenant cloud-computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand database service exists. An on-demand database service, such as that which may be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services may store information from one or more tenants into tables of a common database image to form a multi-tenant database system (MTS). The term "multi-tenant database system" may refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

Application platform 18 may be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 may provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

In some embodiments of the present disclosure, the tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein may be implemented as part of a single database, a distributed database, a collection of distributed databases, a database with redundant online or offline backups or other redundancies, etc., and may include a distributed database or storage network and associated processing intelligence.

The network 14 may be or include any network or combination of networks of systems or devices that communicate with one another. For example, the network 14 may be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 may include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations may use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, and the like), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, and the like), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines, which enable, for example, the seven layers of the open systems interconnection (OSI) model of computer networking or equivalent in a wireless network.

The user systems 12 may communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 may include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), database objects, or some other like object(s)/document(s)). Such an HTTP server may be implemented as the sole network interface 20 between the system 16 and the network 14, but other techniques may be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers may have access to the MTS data; however, other alternative configurations may be used instead.

The user systems 12 may be implemented as any computing device(s) or other data processing apparatus or systems usable by users to access the database system 16. For example, any of user systems 12 may be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other IEEE 802.11x compliant (WiFi-enabled) device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and applications (e.g., application(s) 12y in FIG. 1B) available to it from the system 16 over the network 14. In other implementations, each user system 12 may operate a web or user application (e.g., application 12y in FIG. 1B) designed to interact with applications of the application platform 18 allowing a user (e.g., a subscriber of on-demand services provided by the system 16) of the user system 12 to access, process and view information, pages, interfaces (e.g., UI 30 in FIG. 1B), and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org. may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system/platform. The web, user, or third party application(s) 12y discussed herein may be a software, program code, logic modules, application packages, and/or the like that are built using one or more programming languages and/or development tools, such as those discussed herein. Furthermore, such applications may utilize a suitable querying language to query and store information in an associated tenant space, such as, for example, the various query languages discussed herein or the like.

In an example, the user systems 12 may implement web, user, or third party applications 12y to request and obtain data from database system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, which may provide visual representations of data (also referred to as visual representations 12v or the like) residing in an enterprise cloud or in an on-demand services environment (e.g., a tenant space within database system 16). The GUIs may include one or more components (e.g., graphical control elements (GCEs), tabs, reports, dashboards, widgets, pages, and the like). Examples of such components may include audio/video calling components, messaging components (e.g., chat, instant messaging, short message service (SMS)/multimedia messaging service (MMS) messaging, emailing, and the like), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, and the like). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, and the like. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, and the like) to the database system 16 so that the database system 16 may authenticate the identity of a user of the user system 12.

Each user system 12 typically includes an operating system (OS) 12x to manage computer hardware and software resources, and provide common services for various applications 12y. The OS 12x includes one or more drivers and/or APIs that provide an interface to hardware devices thereby enabling the OS 12x and applications to access hardware functions. The OS 12x includes middleware that connects two or more separate applications or connects applications 12y with underlying hardware components beyond those available from the drivers/APIs of the OS 12x. The OS 12x may be a general purpose OS or a platform-specific OS specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser/application container on a display (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device may be used to access data and applications hosted by system 16, and to perform searches on stored data, and otherwise allow a user to interact with various GUI pages that may be presented to a user. As discussed above, implementations are suitable for use with the Internet, although other networks may be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 may be entirely determined by permissions (permission levels) for the current user of such user system. For example, where a salesperson is using a particular user system 12 to interact with the system 16, that user system may have the capacities allotted to the salesperson. However, while an administrator is using that user system 12 to interact with the system 16, that user system may have the capacities allotted to that administrator.

Where a hierarchical role model is used, users at one permission level may have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components may be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex—A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 may implement instructions for operating and configuring the system 16 to intercommunicate and to process web pages, applications and other data and media content as described herein. In some implementations, the computer code 26 may be downloadable and stored on a hard disk, but the entire program code, or portions thereof, also may be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, and the like) using any communication medium and protocols (e.g., TCP/IP, HTTP, HTTPS, Ethernet, and the like) as are well known. It will also be appreciated that computer code for the disclosed implementations may be realized in any programming language that may be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers 1001-100N. Each application server 100 (also referred to herein as an "app server", an "API server", an "HTTP application server," a "worker node", and/or the like) is configured to communicate with tenant database 22 and the tenant data 23 therein, as well as system database 24 and the system data 25 therein, to serve requests received from the user systems 12. The tenant data 23 may be divided into individual tenant storage spaces 112, which may be physically or logically arranged or divided. Within each tenant storage space 112, user storage 114 and application metadata 116 may similarly be allocated for each user. For example, a copy of a user's most recently used (MRU) items may be stored to user storage 114. Similarly, a copy of MRU items for an entire organization that is a tenant may be stored to tenant storage space 112.

The process space 28 includes system process space 102, individual tenant process spaces 104 and a tenant management process space 110. In various embodiments, the process space 28 includes one or more query processors 103, one or more stream processors 105, and one or more firewall processors 106. The stream processor(s) 105 and firewall processor(s) 106 may be implemented as software components (e.g., software engines, software agents, artificial intelligence (AI) agents, modules, objects, or other like logical units), as individual hardware elements, or a combination thereof. In an example software-based implementation, the stream processor(s) 105 and firewall processor(s) 106 may be developed using a suitable programming language, development tools/environments, and/or the like, which are executed by one or more processors of one or more computing systems (see e.g., processor system 17 of FIG. 1A). In this example, program code of the stream processor(s) 105 and firewall processor(s) 106 may be executed by a single processor or by multiple processing devices. In an example hardware-based implementation, the stream processor(s) 105 and firewall processor(s) 106 are implemented by respective hardware elements, such as GPUs (or floating point units within one or more GPUs), hardware accelerators (e.g., FPGAs, ASICs, DSPs, SoCs, and/or the like) that are configured with appropriate logic blocks, bit stream(s), and/or the like to perform their respective functions, AI accelerating co-processor(s), tensor processing units (TPUs), and/or the like.

The stream processor(s) 105 are systems and/or applications that send or receive data streams and execute the applications or analytics logic in response to detecting events or triggers from the data streams. The stream processor(s) 105 process data directly as it is produced or received and detect conditions from the data streams within a relatively small time period (e.g., measured in terms of milliseconds to minutes). The stream processor(s) 105 may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like.

The firewall processor(s) 106 are systems and/or applications that control the flow of network traffic between networks and/or between individual user systems within a network. The firewall processor(s) 106 may block, permit, or deny access to the inner components of the environment 10 based upon policies 35, which may be, or may include, a set of rules and other criteria. In one example, the firewall processor(s) 106 may be employed to prevent unauthorized access to the app server 100, tenant database 22, system database 24, and/or other aspects of system 16. In one example, the firewall processor(s) 106 may be employed to restrict connectivity or communications between internal networks used to service sensitive functions, such as accounting or personnel. In another example, an enterprise network may employ firewalls to restrict connectivity or communications between certain users in order to enforce compliance with regulatory requirements and/or organization-specific standards.

In some embodiments, the firewall processor(s) 106 perform packet filtering functions, which may include inspecting, in one or more packets, the source address (e.g., IP address), the destination address (e.g., IP address), the communication protocol or service being user to communicate between the source and destination, communication session characteristics (e.g., session source port and destination port), the interface being traversed by the packet and its direction, among others. In some embodiments, the firewall processor(s) 106 may track the state of a connection by inspecting certain values in the headers of the packets to identify the state of each connection (e.g., connection establishment, usage, and termination). In some implementations, the firewall processor(s) 106 may act an application-proxy gateway and/or as a Network Address Translator (NAT).

In some implementations, the firewall processor(s) 106 perform deep packet inspection. In these embodiments, the firewall processor(s) 106 may implement an inspection engine that analyzes protocols at the application layer to compare vendor-developed profiles of benign protocol activity against observed events to identify deviations. This allows a firewall to allow or deny access based on how an application is running over the network. For example, the firewall processor(s) 106 may determine whether an email message includes an attachment with an unauthorized file extension, whether a particular messaging application is being used over a particular port, whether certain commands are being issued or performed (e.g., writing files to an unauthorized destination), allow or deny access to resources containing particular types of content, allow or deny access to resources that have certificates signed or issued by a particular certificate authority, and/or the like.

According to various embodiments, firewall processor(s) 106 may also compress or otherwise reduce the amount of rules needed to enforce one or more policies 35. In such embodiments, the firewall processor(s) 106 generate a service adjacency tensor (SAT) in a three-dimensional (3D) space. The SAT comprises a plurality of vectors, where each vector represents respective rules for individual objects of a set of objects that communicate in a network using one or more services. The firewall processor(s) 106 may generate one or more source groups and one or more destination groups for each object in the set of objects. Each destination group includes objects or subnetworks from the set of objects that are allowed to receive data from that object using one or more services, and each source group includes objects from the set of objects that is allowed to send data to that object using one or more services. Each of the one or more services may include any set of functionalities that is controlled by the policies 35, and may include, for example, communication services (including use of communication protocols, communication channels, Web services, APIs, a traffic types or traffic classes, and/or the like), utility services, application services, capability/infrastructure services, and/or the like. The firewall processor(s) 106 may generate candidate groups from the source group(s) and the destination group(s) for each object, and apply the candidate groups or subnetworks to the SAT. Then, the firewall processor(s) 106 generate a new SAT comprising one or more new vectors. This new SAT is a simplified version of the previous SAT. Each vector in the new SAT represents a new rule for candidate groups communicating in the network using the one or more services. These and other aspects are discussed in more detail infra with respect to FIGS. 3-9.

The application platform 18 includes an application setup mechanism (ASM) 38 that supports application developers' ("app developers") creation and management of applications. Such applications and others may be saved as metadata into tenant database 22 by save routines 36 for execution by subscribers as one or more tenant process spaces 104 managed by tenant management process 110, for example. Invocations to such applications may be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

In some implementations, the application platform 18 also includes policies 35. The policies 35 (also referred to as "rulesets" or the like) comprise documents and/or data structures that define a set of rules that govern the behavior of the firewall processor(s) 106 and/or other subsystems of the app server 100 when controlling network traffic flows. For example, one or more of the policies 35 may dictate how the firewall processor(s) 106 should handle network traffic for specific network addresses and address ranges, protocols, services, applications, content types, and/or the like, based on an organization's information security (infosec) policies, regulatory and/or auditing policies, and the like. Additionally, the policies 35 may specify (within various levels of granularity) particular users, and user groups, that are authorized to access particular resources or types of resources, based on the org's hierarchical structure, and security and regulatory requirements.

The policies 35 in the application platform 18 may include operator (or service provider) policies 35, which are used to control data flows to or within the system 16; and/or tenant policies 35, which are used for controlling data flows and/or limit access to specific tenant data for a particular tenant/org. Both the operator and tenants may use any suitable programming languages, markup languages, schema languages, and/or the like, to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein. The documents or data structures of the policies 35 may include a "description," which is a collection of software modules, program code, logic blocks, parameters, rules, conditions, and/or the like, that may be used by the firewall processor 106 to control network flows, as well as share data with various resources.

In some embodiments, the policies 35 may be, or may include, access control lists (ACLs), which are lists of permissions attached to an object specifying users, system processes, or other objects that are granted access to that object and operations that are allowed to be performed on the object. For computer networking implementations, the ACLs may indicate rules that are applied to port numbers and/or network addresses of a host, each with a list of hosts and/or networks permitted to use services provided by that host or via the port numbers and/or network addresses. In capirca implementations, the policies 35 may include one or more filters, where each filter contains one or more terms, and each term specifies basic network filter information such as addresses, ports, protocols, and actions. Additionally, the policies include one or more header sections followed by the one or more terms. The header sections specify a filter for a given direction communication, such as one filter for an input direction and one filter for an output direction. In some implementations, tenants (or developers associated with the tenants/orgs) may define or set the rules to be included in their respective policies 35 both through a suitable API 32 and/or through a web based graphical user interface (GUI) 30. Where APIs 32 are used, the policies 35 may be developed using any suitable mark-up or object notation language, such as the various languages, tools, and/or the like discussed herein.

As alluded to previously, the policies 35 may be amended to include new rules or updates to existing rules, and as such, the policies 35 may also include specific guidance on how to address changes to the rulesets making up the policies 35. The addition of new and/or updated rules to the policies 35 increases the size of the policies 35, which increases the amount of memory/storage resources needed to store the policies 35 and increases the amount of computational resources needed to perform the various firewall processing functions according to the policies 35. As discussed in more detail infra, the policies 35 may be reduced or compressed according to the various embodiments herein. In some embodiments, the policies 35 themselves may include rules, criteria, parameters, and/or the like, used for reducing the rules making up the policies 35 according to the various embodiments discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, and/or the like that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, and/or the like) in a web browser or application container).

The system 16 of FIG. 1B also includes a user interface (UI) 30 and an API 32 (also referred to as a "web service") to system 16 resident processes, which allow users or developers at user systems 12 to access the resident processes. In some implementations, application (app) code, app/service templates, and/or policies 35 developed by tenants may be pushed or otherwise sent to the system 16 using API 32. In these implementations, the app code, app/service templates, and/or policies 35 may be developed using a development (dev) environment, programming language(s), and/or dev-tools provided by the system 16. The API 32 may be implemented as a remote API or a web API, such as a Representational State Transfer (REST or RESTful) API, Simple Object Access Protocol (SOAP) API, salesforce(dot)com Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data. These endpoints specify where resources are located and/or how particular web services may be accessed. The application 12y may be used to generate and transmit a message (e.g., an HTTP message) with a user-issued query and a suitable URI/URL to access of an endpoint of the system 16. In some embodiments of the present disclosure, one or more of the public APIs may be an asynchronous ("async") query API, where the user-issued query includes an API call or other like instruction indicating that a user-issued query should be treated as an aysnc query (referred to as an "async query verb"). The async query verbs to invoke the async query API may be defined by API 32 and may be coded using PL/SOQL 34 or some other suitable programming or query language. When an async query invokes the async query API, an async query engine (e.g., query engine 103) or async query scheduler may generate a corresponding async query job. The term "job" as used herein refers to a unit of work or execution that performs work that comprises one or more tasks. Individual jobs may have a corresponding job entity comprising a record or database object that stores various values, statistics, metadata, and/or the like during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine 103, stream processor(s) 105, and firewall processor(s) 106 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32.

For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 may be communicably coupled with tenant database 22 and system database 24, for example, having access to tenant data 23 and system data 25, respectively, via a different network connection 15. For example, one application server 1001 may be coupled via the network 14 (e.g., the Internet), another application server 100N-1 may be coupled via a direct network link 15, and another application server 100N may be coupled by yet a different network connection 15. Transfer Control Protocol and Internet Protocol (TCP/IP) are examples of typical protocols that may be used for communicating between application servers 100 and the system 16. However, it will be apparent to one skilled in the art that other transport protocols may be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various database functions (e.g., indexing, querying, and/or the like) as well as formatting obtained data (e.g., ELT data, ETL data, and the like) for various user interfaces to be rendered by the user systems 12. Because it may be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the application servers 100 (see e.g., load balancer 228 of FIGS. 2A-2B discussed infra). Other examples of load balancing algorithms, such as round robin and observed-response-time, also may be used. For example, in some instances, three consecutive requests from the same user could hit three different application servers 100, and three requests from different users could hit the same application server 100. In this manner, by way of example, system 16 may be a multi-tenant system in which system 16 handles storage of, and access to, different objects, data and applications across disparate users and organizations.

In one example storage use case, one tenant may be an organization (org) that employs a sales force where each salesperson uses system 16 to manage aspects of their sales. A user may maintain contact data, leads data, customer follow-up data, performance data, goals and progress data, and/or the like, all applicable to that user's personal sales process (e.g., in tenant database 22). In an example of a MTS arrangement, because all of the data and the applications to access, view, modify, report, transmit, calculate, and/or the like, may be maintained and accessed by a user system 12 having little more than network access, the user may manage his or her sales efforts and cycles from any of many different user systems. For example, when a salesperson is visiting a customer and the customer has Internet access in their lobby, the salesperson may obtain critical updates regarding that customer while waiting for the customer to arrive in the lobby.

While each user's data may be stored separately from other users' data regardless of the employers of each user, some data may be organization-wide data shared or accessible by several users or all of the users for a given organization that is a tenant. Thus, there may be some data structures managed by system 16 that are allocated at the tenant level while other data structures may be managed at the user level. Because an MTS may support multiple tenants including possible competitors, the MTS may have security protocols that keep data, applications, and application use separate. In addition, because many tenants may opt for access to an MTS rather than maintain their own system, redundancy, up-time, and backup are additional functions that may be implemented in the MTS. In addition to user-specific data and tenant-specific data, the system 16 also may maintain system level data usable by multiple tenants or other data. Such system level data may include industry reports, news, postings, and the like that are sharable among tenants.

In some implementations, the user systems 12 (which also may be client systems) communicate with the application servers 100 to request and update system-level and tenant-level data from the system 16. Such requests and updates may involve sending one or more queries to tenant database 22 or system database 24. The system 16 (e.g., an application server 100 in the system 16) may automatically generate one or more native queries (e.g., SQL statements or SQL queries or the like) designed to access the desired information from a suitable database. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, database manager, compiler, execution engine, and/or other like components. In some implementations, each of the illustrated databases may generate query plans to access the requested data from that database, for example, the system database 24 may generate query plans to access the requested data from the system database 24. The term "query plan" generally refers to one or more operations used to access information in a database system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, and the like), a key-value datastore or NoSQL database engines (e.g., DynamoDB® provided by Amazon (dot)com®, MongoDB query framework provided by MongoDB Inc.®, Apache® Cassandra, Redis™ provided by Redis Labs®, and the like), MapReduce query engines (e.g., Apache® Hive™, Apache® Impala™ Apache® HAWQ™, IBM® Db2 Big SQL®, and the like for Apache® Hadoop® database systems, and the like), relational database (or "NewSQL") engines (e.g., InnoDB™ or MySQL Cluster™ developed by Oracle®, MyRocks™ developed by Facebook (dot)com®, FaunaDB provided by Fauna Inc.), PostgreSQL database engines (e.g., MicroKernel Database Engine and Relational Database Engine provided by Pervasive Software®), graph processing engines (e.g., GraphX of an Apache® Spark® engine, an Apache® Tez engine, Neo4J provided by Neo4j, Inc.™, and the like), pull (iteration pattern) query engines, push (visitor pattern) query engines, transactional database engines, extensible query execution engines, package query language (PaQL) execution engines, LegoBase query execution engines, and/or some other query engine used to query some other type of database system (such as any processing engine or execution technology discussed herein). In some embodiments, the query engine(s) 103 may include or implement an in-memory caching system and/or an in-memory caching engine (e.g., memcached, Redis, and the like) to store frequently accessed data items in a main memory of the system 16 for later retrieval without additional access to the persistent data store.

Each database may generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table may contain an instance of data for each category defined by the fields. For example, a CRM database may include a table that describes a customer with fields for basic contact information such as name, address, phone number, fax number, and the like Another table may describe a purchase order, including fields for information such as customer, product, sale price, date, and/or the like In some MTS implementations, standard entity tables may be provided for use by all tenants. For CRM database applications, such standard entities may include tables for case, account, contact, lead, and opportunity data objects, each containing predefined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Referring now to the user system 12 in FIG. 1B, the user system 12 includes a processor system 12A, which may include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAR)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B may include any suitable combination of one or more memory devices, such as volatile storage devices (e.g., random access memory (RAM), dynamic RAM (DRAM), and/or the like) and non-volatile memory device (e.g., read only memory (ROM), flash memory, and/or the like). The memory system 12B may store program code for various applications (e.g., application 12y and/or other applications discussed herein) for carrying out the procedures, processes, methods, and/or the like of the embodiments discussed herein, as well as an operating system (OS) 12x and one or more databases or database objects (not shown).

The OS 12x manages hardware and software resources of the user system 12, and provides common services for the applications via one or more drivers and/or APIs that provide an interface to hardware devices thereby enabling the OS 12x and applications to access hardware functions. The OS 12x or some other code stored in memory system 12B may include middleware that connects two or more separate applications or connects applications with underlying hardware components beyond those available from OS 12x and/or the drivers/APIs. The OS 12x may be a general-purpose operating system or an operating system specifically written for/tailored to the user system 12.

The application(s) 12y is/are a software application designed to run on the user system 12 and is used to access data stored by the database system 16. The application 12y may be platform-specific, such as when the user system 12 is implemented in a mobile device, such as a smartphone, tablet computer, and the like. The application 12y may be a native application, a web application, or a hybrid application (or variants thereof). The application 12y may be developed using any suitable programming language and/or development tools such as any of those discussed herein. In some implementations, the application 12y may be developed using platform-specific development tools and/or programming languages such as those discussed herein. Suitable implementations for the OS 12x, databases, and applications 210, as well as the general functionality of the user system 12 are known or commercially available, and are readily implemented by persons having ordinary skill in the art, particularly in light of the disclosure herein.

The input system 12C may include any suitable combination of input devices, such as one or more touchscreen interfaces, keyboards, mice, trackballs, scanners, cameras, or interfaces to networks. The output system 12D may include any suitable combination of output devices, such as one or more display devices, printers, or interfaces to networks. The output system 12D is used to display visual representations and/or GUIs 12v based on various user interactions.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, and/or the like) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), and the like), and/or a wired communication protocol (e.g., Ethernet, Fiber Distributed Data Interface (FDDI), Point-to-Point (PPP), and the like). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

Figure 2A:
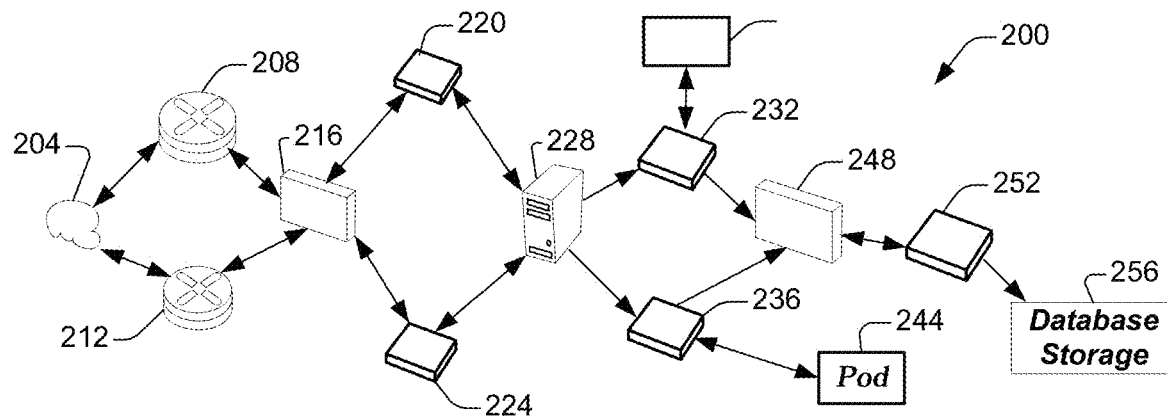
FIG. 2A shows example architecture of an on-demand database service environment according to some embodiments of the present disclosure.

FIG. 2A shows a system diagram illustrating example architectural components of an on-demand database service environment 200 according to some implementations. A client machine communicably connected with the cloud 204, generally referring to one or more networks in combination, as described herein, may communicate with the on-demand database service environment 200 via one or more edge routers 208 and 212. A client machine may be any of the examples of user systems 12 described above. The edge routers may communicate with one or more core switches 220 and 224 through a firewall 216. The core switches may communicate with a load balancer 228, which may distribute server load over different pods, such as the pods 240 and 244. The pods 240 and 244, which may each include one or more servers or other computing resources, may perform data processing and other operations used to provide on-demand services. Communication with the pods may be conducted via pod switches 232 and 236. Components of the on-demand database service environment may communicate with database storage 256 through a database firewall 248 and a database switch 252.

Figure 2B:
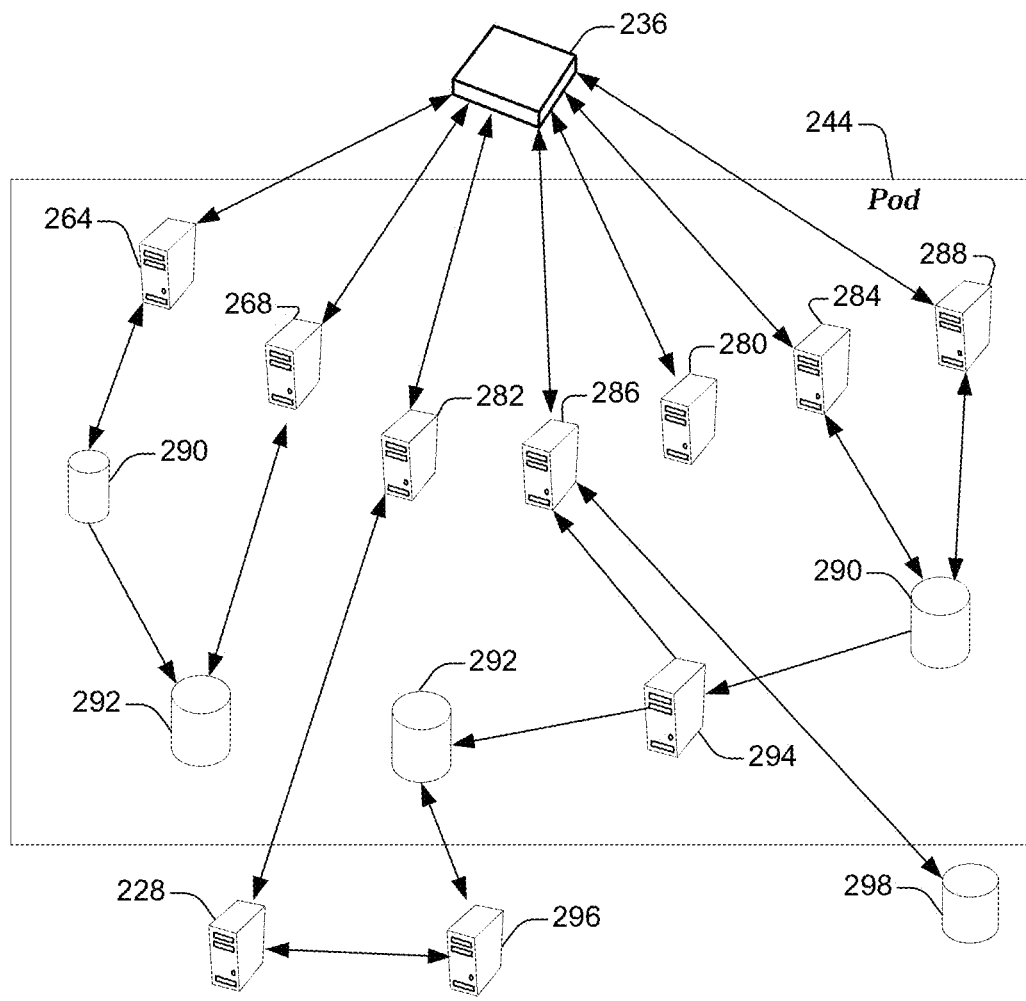
FIG. 2B shows example architectural components of the on-demand database service environment of FIG. 2A according to various embodiments.

As shown in FIGS. 2A and 2B, accessing an on-demand database service environment may involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to several devices of each type. Also, the on-demand database service environment need not include each device shown in FIGS. 2A and 2B, or may include additional devices not shown in FIGS. 2A and 2B.

Additionally, it should be appreciated that one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, rather references to these terms may include any suitable combination of hardware and software configured to provide the described functionality.

The cloud 204 is intended to refer to a data network or multiple data networks, often including the Internet. Client machines communicably connected with the cloud 204 may communicate with other components of the on-demand database service environment 200 to access services provided by the on-demand database service environment. For example, client machines may access the on-demand database service environment to retrieve, store, edit, or process information. In some implementations, the edge routers 208 and 212 route packets between the cloud 204 and other components of the on-demand database service environment 200. For example, the edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In some implementations, the firewall 216 may protect the inner components of the on-demand database service environment 200 from Internet traffic. In some embodiments, firewall 216 may be an active firewall. The firewall 216 may block, permit, or deny access to the inner components of the on-demand database service environment 200 based upon a set of rules and other criteria (e.g., the policies 35 discussed previously). The firewall 216 may act as, or implement one or more of a packet filter, an application gateway, a stateful filter, a proxy server, virtual private networking (VPN), network access controller (NAC), host-based firewall, unified threat management (UTM) system, a Predictive Intelligence (PI) and/or FaaS such as described in commonly assigned U.S. patent application Ser. No. 15/847,229 titled AUTOMATED HOST-BASED FIREWALL CONFIGURATION MANAGEMENT filed on Dec. 21, 2017 and hereby incorporated by reference in its entirety and for all purposes, and/or any other type of firewall technology. Additionally, the firewall 216 may be equipped with group and/or sub-network optimization technologies.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy or reduced latency.

In some implementations, the pods 240 and 244 perform the core data processing and service functions provided by the on-demand database service environment. Each pod may include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 may facilitate communication between the pods 240 and 244 and client machines communicably connected with the cloud 204, for example via core switches 220 and 224. In addition, the pod switches 232 and 236 may facilitate communication between the pods 240 and 244 and the database storage 256. In some implementations, the load balancer 228 may distribute workload between the pods 240 and 244. Balancing the on-demand service requests between the pods may assist in improving the use of resources, increasing throughput, reducing response times, or reducing overhead. The load balancer 228 may include multilayer switches to analyze and forward traffic.

In some implementations, access to the database storage 256 is guarded by a database firewall 248. In some implementations, the database firewall 248 is an active firewall. Additionally, the firewall 248 may be equipped with the group optimization technologies discussed herein. The database firewall 248 may act as a computer application firewall operating at the database application layer of a protocol stack. The database firewall 248 may protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 may include more than one hardware or software components for handling database queries. Accordingly, the database switch 252 may direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B. FIG. 2B shows a system diagram further illustrating example architectural components of an on-demand database service environment according to some implementations. The pod 244 may be used to render services to a user of the on-demand database service environment 200. In some implementations, each pod includes a variety of servers or other systems. The pod 244 includes one or more content batch servers 264, content search servers 268, query servers 282, file (force) servers 286, access control system (ACS) servers 280, batch servers 284, and app servers 288. The pod 244 also may include database instances 290, quick file systems (QFS) 292, and indexers 294. In some implementations, some or all communication between the servers in the pod 244 may be transmitted via the switch 236.

In some implementations, the app servers 288 include a hardware or software framework dedicated to the execution of procedures (e.g., programs, routines, scripts, and the like) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 may be included and cooperate to perform such methods, or one or more other servers described herein may be configured to perform the disclosed methods. In various implementations, the app servers 288 may be the same or similar to the app servers 100 discussed with respect to FIGS. 1A-1B.

The content batch servers 264 may handle requests internal to the pod. Some such requests may be long-running or not tied to a particular customer. For example, the content batch servers 264 may handle requests related to log mining, cleanup work, and maintenance tasks. The content search servers 268 may provide query and indexer functions. For example, the functions provided by the content search servers 268 may allow users to search through content stored in the on-demand database service environment. The file servers 286 may manage requests for information stored in the file storage 298. The file storage 298 may store information such as documents, images, and basic large objects (BLOBs). By managing requests for information using the file force servers 286, the image footprint on the database may be reduced. The query servers 282 may be used to retrieve information from one or more file systems. For example, the query system 282 may receive requests for information from the app servers 288 and transmit information queries to the NFS 296 located outside the pod.

The pod 244 may share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 may transmit instructions to other servers, such as the app servers 288, to trigger the batch jobs.

In some implementations, a QFS 292 is an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata may be kept on a separate set of disks, which may be useful for streaming applications where long disk seeks cannot be tolerated. Thus, the QFS system may communicate with one or more content search servers 268 or indexers 294 to identify, retrieve, move, or update data stored in the network file systems (NFS) 296 or other storage systems.

In some implementations, one or more query servers 282 communicate with the NFS 296 to retrieve or update information stored outside of the pod 244. The NFS 296 may allow servers located in the pod 244 to access information to access files over a network in a manner similar to how local storage is accessed. In some implementations, queries from the query servers 282 are transmitted to the NFS 296 via the load balancer 228, which may distribute resource requests over various resources available in the on-demand database service environment. The NFS 296 also may communicate with the QFS 292 to update the information stored on the NFS 296 or to provide information to the QFS 292 for use by servers located within the pod 244.

In some implementations, the pod includes one or more database instances 290. The database instance 290 may transmit information to the QFS 292. When information is transmitted to the QFS, it may be available for use by servers within the pod 244 without using an additional database call. In some implementations, database information is transmitted to the indexer 294. Indexer 294 may provide an index of information available in the database 290 or QFS 292. The index information may be provided to file force servers 286 or the QFS 292.

The embodiments herein provide a heuristic approach to grouping sets of intercommunicating objects to minimize or otherwise reduce the number of rules and/or policies 35 governing the communication between the objects. In particular, the embodiments optimize the groupings of dataflow given a set of objects communicating with each other using different services or protocols. As alluded to previously, an example use case utilizing these embodiments involves securing network data flows and enforcing rules/policies for an organization (org). This involves making sure that only specific data flows are allowed within the internal network, only specific data flows are allowed into the internal network from outside, and only specific data flows are allowed from the internal network to outside the internal network.

As an example, a particular org. may include multiple branches arranged in an org. hierarchy, where each branch includes various object types such as managers, employees, contractors, and procurement. In the context of the present disclosure, these objects may be representations of specific computing systems (e.g., any of the systems devices discussed previously with respect to FIGS. 1A-1B and 2A-2B), instances of specific user sessions, and/or the like. In this example, an org. policy 35 indicates that, for each branch, managers and employees may communicate with each other and with contractors, while contractors may communicate only with procurement-related objects. In some embodiments of the present disclosure, the ruleset in the org. policy 35 may be reduced by grouping the managers and employees into an "internal" group and replacing the rules for the managers and employees with new rules for the internal group. Classifying the objects in this way may reduce the number or rules in a given policy 35, which reduces the amount of memory/storage space needed to store the policies 35 on various devices (e.g., app servers 100, firewalls 216 and 248, and the like). The freeing up of these memory/storage resource may improve the performance (e.g., in terms of latency, response time, etc.) of these devices/systems.

Figure 3:
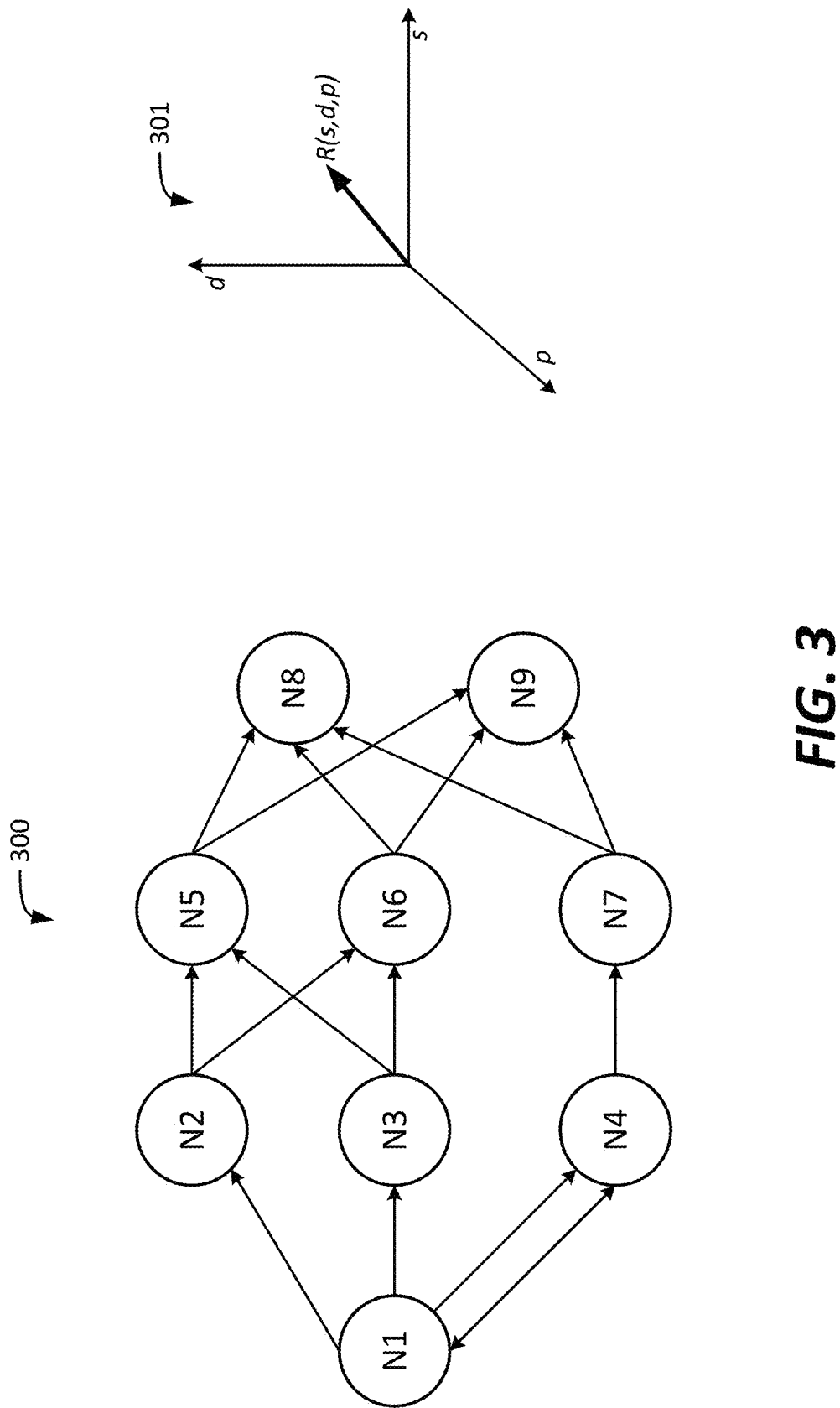
FIG. 3 illustrates an example service graph and an example rule vector according to some embodiments of the present disclosure.

In various embodiments, a network of objects (or "network flow") is modeled using a suitable graphing algorithm, an example of which is shown by FIG. 3. FIG. 3 illustrates an example service graph 300, which is a graphical representation of a network flow for a given service. A "graph" in this context refers to a data structure or data type that comprises a number of (or set of) nodes (also referred to as "vertices," "points," or "objects"), which are connected by a number of (or set of) edges, arcs, or lines. A graph may be an undirected graph having edges with no orientation, or a directed graph having oriented edges. An edge has two or more vertices to which it is attached, called endpoints. Edges may also be directed or undirected; undirected edges are also referred to as "lines" and directed edges are also referred to as "arcs" or "arrows." An undirected edge between two nodes may be represented as a pair of arcs connecting the same nodes in the opposite directions, and therefore, it is possible to transform an unoriented graph into an oriented one (whereas the opposite transformation is not usually possible). Two or more vertices forming an edge may be referred to as the "endpoints" of that edge. The service graph 300 of FIG. 3 is a directed graph. Each of the directed edges (or arrows) is shown by a line with an arrowhead at one end of the line. The directed edges (or arrows) represent a direction of communication (or data flow) from one node ("source") to another node ("destination"). In particular, the node attached to the end of an edge without the arrowhead is a source node and the node attached to the end of an edge with the arrowhead is a destination node. Although the example embodiments are described herein with respect to graphs, the embodiments may also be applicable to using hypergraphs, which are graphs with multiple edges.

In the example of FIG. 3, the service graph 300 includes nine nodes (or objects), labeled node 1 (N1) to node 9 (N9). The service graph 300 shows the interconnections between the objects for a single service. In this context, the service may be any discrete function within an environment represented by the service graph 300. As examples, individual services may include communication services, utility services, application services, capability/infrastructure services, and/or the like.

Each of the nodes (or vertices) N1-N9 may represent individual hosts (e.g., any resource connected to a network such as computing systems/devices, users, tenants, and/or the like), host groups, or networks. In some embodiments, each of the nodes (or vertices) N1-N9 may represent individual objects, variables, instance variables, properties, data types, data structures, functions, methods, memory locations/spaces, classes, modules, software engines, table, row/record, column/field, database objects, and/or the like, in a programming/database development paradigm. In some embodiments, the numbers or values included in the nodes may be an identifier of an entity represented by that node, or some other attribute or piece of data that describe each instance of that node.

Each arrow in the service graph 300 represents a rule allowing a specific communication flow between two nodes, and may be seen as a policy element of the policies 35 allowing a specific communication between peer nodes using a particular communication protocol (service). In some embodiments of the present disclosure, a rule R includes a source s to a destination d using service p. In networking/firewall implementations, the service component p is a network service or protocol, and the rule R is (or includes) a tuple containing the protocol, source port(s), and destination port(s). Examples of such rules R may include "tcp/any/80" or "tcp/1024-65535/80", which may represent two different services. Some optimization may be performed if, for example, two services have identical destination port(s) and protocol, and the source port(s) of one service is a subset of the other service. These optimizations should be performed in the pre-processing phase. According to various embodiments, each rule R may be expressed as a 3D rule vector, such a rule vector 301. A vector is a quantity having a direction and a magnitude, which may be used to determine the position of one point in space relative to another.

The rule vector 301 represents a rule R as a physical 3D quantity with a magnitude and direction in a 3D space. This 3D space includes a source direction (or axis) s, a destination direction (or axis) d, and a service direction (or axis) p. The rule vector 301 comprises three components including a source component s, a destination component d, and a service component p. These components define the magnitude and direction of the rule vector 301.

Each arc connecting two endpoints in the service graph 300 constitute a rule R. The collection of rules R in the service graph 300 are part of an individual policy 35. For the sake of clarity, in this example each rule R in the service graph 300 have the same service component p. The graph 300 is a representation of all the data flows allowed for a given service. In some embodiments of the present disclosure, the policies 35 may be represented by a tensor, such as a Service Adjacency Tensor (SAT) comprising all the rules for all the services. The rules belonging to policies 35 for a specific service may be represented using an adjacency matrix (that is also a "frontal" slice of the SAT, see e.g., FIG. 5), which is referred to as a Service Adjacency Matrix (SAM). Generally, an element Aij in an adjacency matrix A is one ("1") when there is an edge from vertex i to vertex j and zero ("0") when there is no edge from vertex i to vertex j. Adjacency matrices are also used as data structures for the representation of graphs where the elements of the adjacency matrix indicate whether pairs of vertices are connected (adjacent) or not in the graph. In some embodiments of the present disclosure, an element Su in a SAM S is set to one ("1") when communication using a given protocol from vertex i to vertex j is allowed, and zero ("0") when communication using the given protocol from vertex i to vertex j using is not allowed.

The SAM is a service-specific adjacency matrix or other like multidimensional array or arrangement of numbers, symbols, or expressions representing a subset of the policy 35. For a given service, an SAT represents a policy 35, including all the rules allowing communication between nodes/objects using the given communication protocol of that policy 35. The graph and its SAT representation show that:

Source N1 is allowed to communicate with destinations N2, N3, and N4;
Source N2 is allowed to communicate with destinations N5 and N6;
Source N3 is allowed to communicate with destinations N5 and N6;
Source N4 is allowed to communicate with destinations N1 and N7;
Source N5 is allowed to communicate with destinations N8 and N9;
Source N6 is allowed to communicate with destinations N8 and N9;
Source N7 is allowed to communicate with destinations N8 and N9;
Source N8 is allowed to communicate with no destination nodes; and
Source N9 is allowed to communicate with no destination nodes.

In the service state, the firewall processor(s) 106 enforce each rule R in the 3D space, each of which comprises a source, destination, and protocol (s,d,p). Usually, firewall rules and SAT or the SAM of table 1 or the graph 300 are disconnected models. In various embodiments, these models are unified into a single model to optimize the rules. An example of this combination is shown by FIG. 4.

FIG. 4 shows an exemplary service adjacency matrix (SAM) 401 and an example Service Adjacency Tensor (SAT) 402 according to various embodiments. The SAM 401 may be the same or similar to the SAM represented by table 1 (discussed supra), which is shown in a 3D space. Each point in the SAM 401 for a specific service is a rule R (not shown by FIG. 4), where each rule, R is expressed as a 3D rule vector (e.g., rule vector 301 of FIG. 3). As mentioned previously, a rule vector 301 represents rule R and includes a source s, a destination d, and a service p. In this example, the SAM 401 is shown along a source axis and a destination axis because the SAM 401 represents a ruleset for a single service p.

According to various embodiments, a set of policies 35 may be represented as a Service Adjacency Tensor (SAT) 402, which comprises a plurality of service-specific SAMs 401. A tensor is an algebraic object analogous to, but more general than, a vector, which is represented by arrays of components that are functions of the coordinates of a space. For purposes of the present disclosure, a tensor is represented by a 3D matrix (an ordered group of 2D matrices called SAMs). The SAT 402 models the policies 35, describing the communication rules for multiple services p between multiple objects. The basic construct is to model the policies 35 as a group of rule vectors 301 in a 3D space. This implies identifying a tensor, such as the SAT 402, representing all possible rules in a given network. In this example, each of the SAMs 401 making up the SAT 402 comprises the set of service-specific rules R for respective services p. Combining multiple service-specific SAMs 401 creates the SAT 402 in the 3D space. Additionally, each of the SAMs 401 making up the SAT 402 may be represented by a table or matrix. Each of these tables or matrices define service-specific rules between a source and a destination using a service, and each table or matrix is a representation of a graph that is similar to service graph 300.

The problem of reducing the number of rules is basically a problem of linear combination (change base vectors), and may be tackled from different perspectives. In the present disclosure, a heuristic, less formal, approach is used to reduce the number of rules.

Figure 5:
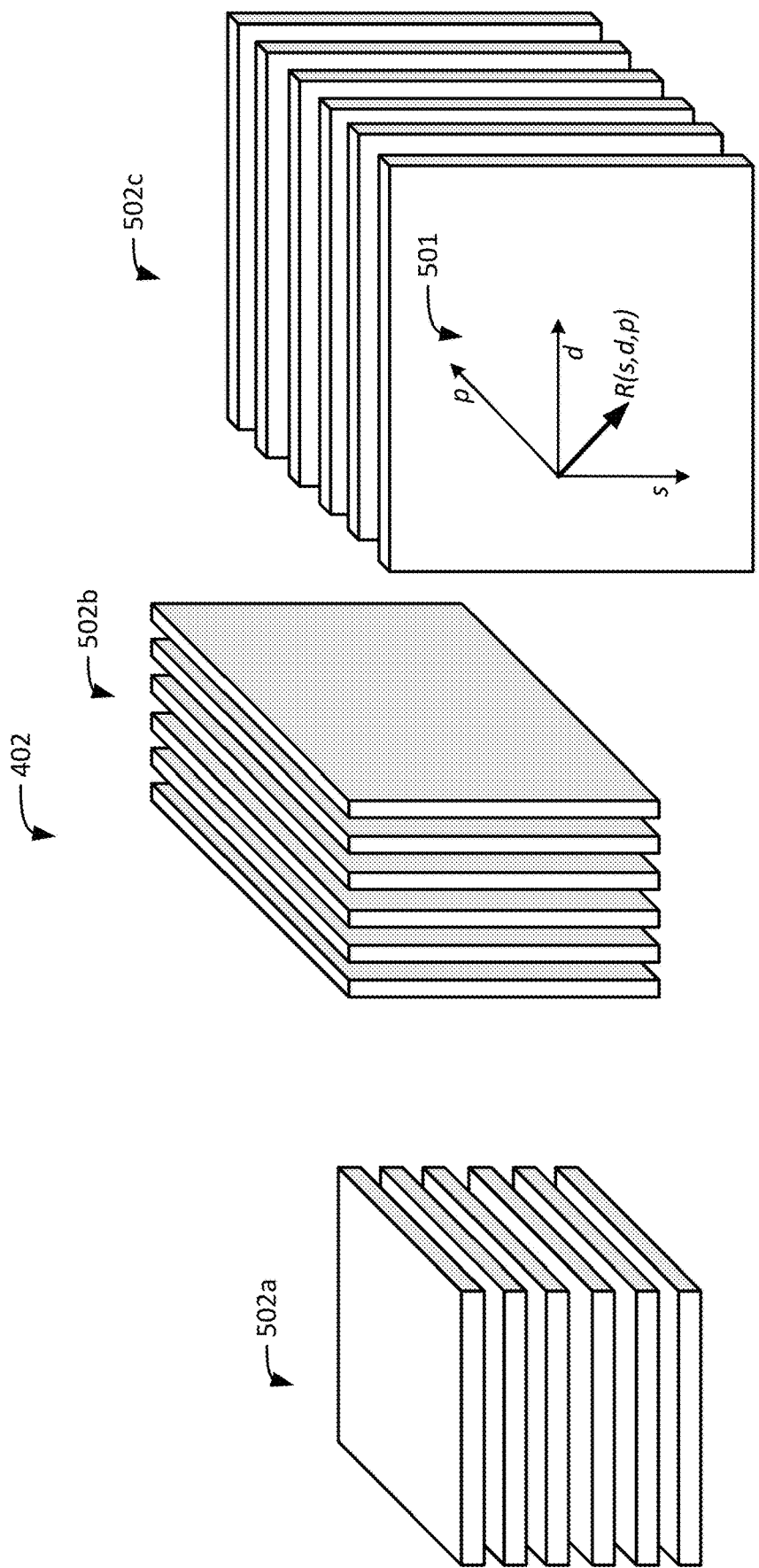
FIG. 5 shows various slices of the first adjacency data structure (SAT) of FIG. 4, including horizontal, vertical, and frontal slices, according to some embodiments of the present disclosure.

FIG. 5 shows various slices of SAT 402 including horizontal slices 502a in the source (s) plane ($X_{s,:,:}$), vertical/lateral slices 502b in the destination (d) plane ($X_{:,d,:}$), and frontal slices 502c ($X_{:,:,p}$). Each horizontal slice 502a of the SAT 402 in the s plane ($X_{s,:,:}$) represents all possible destinations with which a given source Ns is allowed to communicate. Each lateral/vertical slice 502b of the SAT 402 in the d plane represents all sources that are allowed to communicate with a given destination Nd ($X_{:,d,:}$). Each frontal slice 502c of the SAT 402 in the p plane is a service-specific SAM 401, representing the adjacencies between different nodes for a given service ($X_{:,:,p}$ or Xp) or in other terms, all the rules allowing communications between nodes for a given service. Regardless of how the SAT 402 is sliced, each component of the SAT 402 is a firewall rule R, an example of which is depicted in the frontal slices 502c. The rule vector 501 may be the same or similar to the vector rule 301 discussed previously with respect to FIG. 3.

Figure 6:
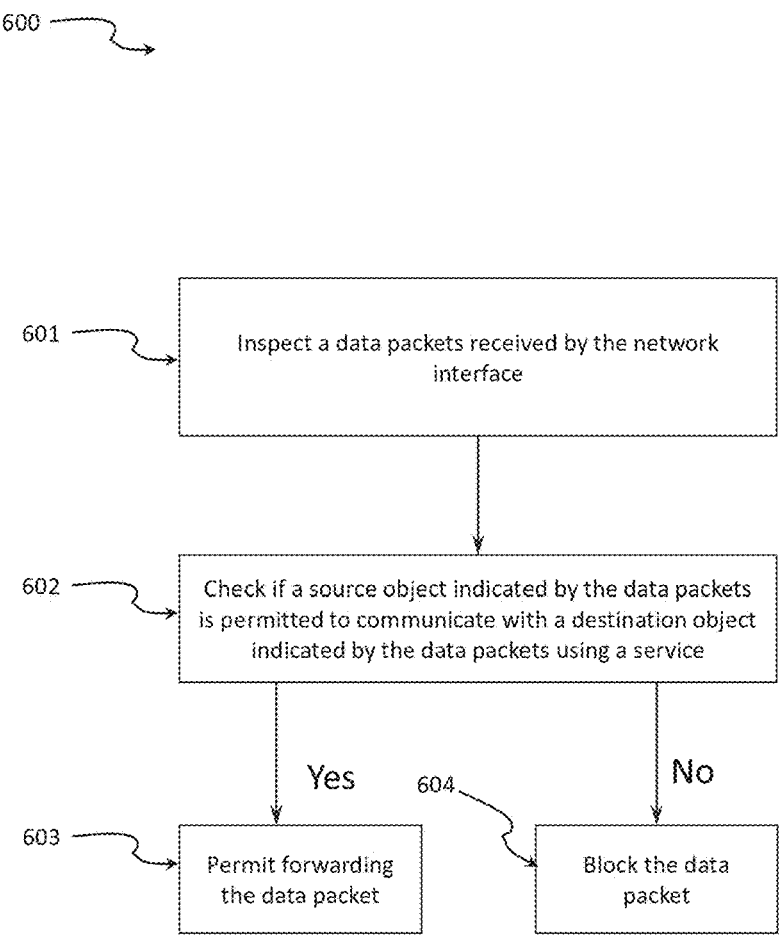
FIG. 6 shows a flowchart of an exemplary process for enforcing network security policies, using an access control list, according to some embodiments of the present disclosure.

Reference is now made to FIG. 6, which shows a flowchart of an exemplary process for enforcing network security policies, using an access control list, according to some embodiments of the present disclosure.

The exemplary process 600 may be executed for enforcing network security policies by variety of network devices. The process 600 may be used to control enforcement of the one or more old and/or new policies, and protect the network resources from accidental or deliberate unauthorized access. The process 600 may be executed whenever a packet is received by a network component, a device or a computing system such as a switch, a pod switch (e.g. 236 in FIG. 2A), a router, a gateway appliance, a server computer system, a firewall computer appliance, such as a firewall (e.g. 216 in FIG. 2A), a database firewall (e.g. 248 in FIG. 2A), and/or devices comprising similar computing resources and network connections.

The system executing processes such as 600, may maintain a ruleset, which includes a plurality of rules. Optionally, rules comprise a source object that is allowed to communicate with a destination object using a service. Alternatively, rules comprise one or more groups or subnetworks of source objects, that are allowed to communicate with one or more groups or subnetworks of destination objects, using one or more services. Rules may comprise additional data, such as instructions to register log files for auditing, different behavior during different hours or days of the week, metadata, comments, and/or the likes.

The exemplary process 600 starts when the network component receives a data packet at the network interface, by receiving the data packet and inspecting it as shown in 601. The data packet may comprise metadata, for example a header or a descriptor, in addition to the data payload. The network component executing the process 600 may extract information about the source, destination and service from one or more headers, descriptors, and/or additional metadata fields the data packet comprises. The policies and the rules of the network may apply to packet properties such as addresses, for example TCP and/or IP addresses, port numbers, protocol identifiers, and/or the like.

The exemplary process 600 continues by verifying that the source object is permitted to communicate with the destination object using the service, as shown in 602. The source object, the destination object, and the service, may be indicated by the data packet. Alternatively, the source object, the destination object, and the service may be indicated indirectly by a link, metadata associated with a former packet, and/or the like.

Verifying the packet is compliant with the network policies may comprise searching for a rule. The rule may either be specific to the source object, destination object, and the service, or a more general rule comprising subnetworks, entire networks, address ranges, port ranges, and/or the like.

Alternatively, the list of rules may comprise blocking conditions, a priority list, a decision tree, and/or the like. Accordingly, verifying the packet is compliant with the network policies may comprise, for example, searching a decision tree. Verifying the packet is compliant with the network policies may require many comparison operations, which may be slow without hardware acceleration. This affirms the benefits in keeping the rule list as short as possible and minimizing redundancies, for saving comparison operation and/or occupancy of expensive content addressable memory, or ternary content addressable memory when using masks, ranges, and/or the likes.

When the packet is compliant with the network policies, or the associative rule allows the communication, the network component executing the process 600 may permit forwarding the data packet, as shown in 603. Otherwise, when the packet is non-compliant with the network policies, no associative rule allows the communication, or that the associative rule precludes allows the communication, the network component executing the process 600 may block the data packet, as shown in 604. The network component may ignore the non-compliant data packet, or send a negative acknowledgement to the source object. The network element may further communicate with other network elements to indicate a data packet was blocked.

Figure 7:
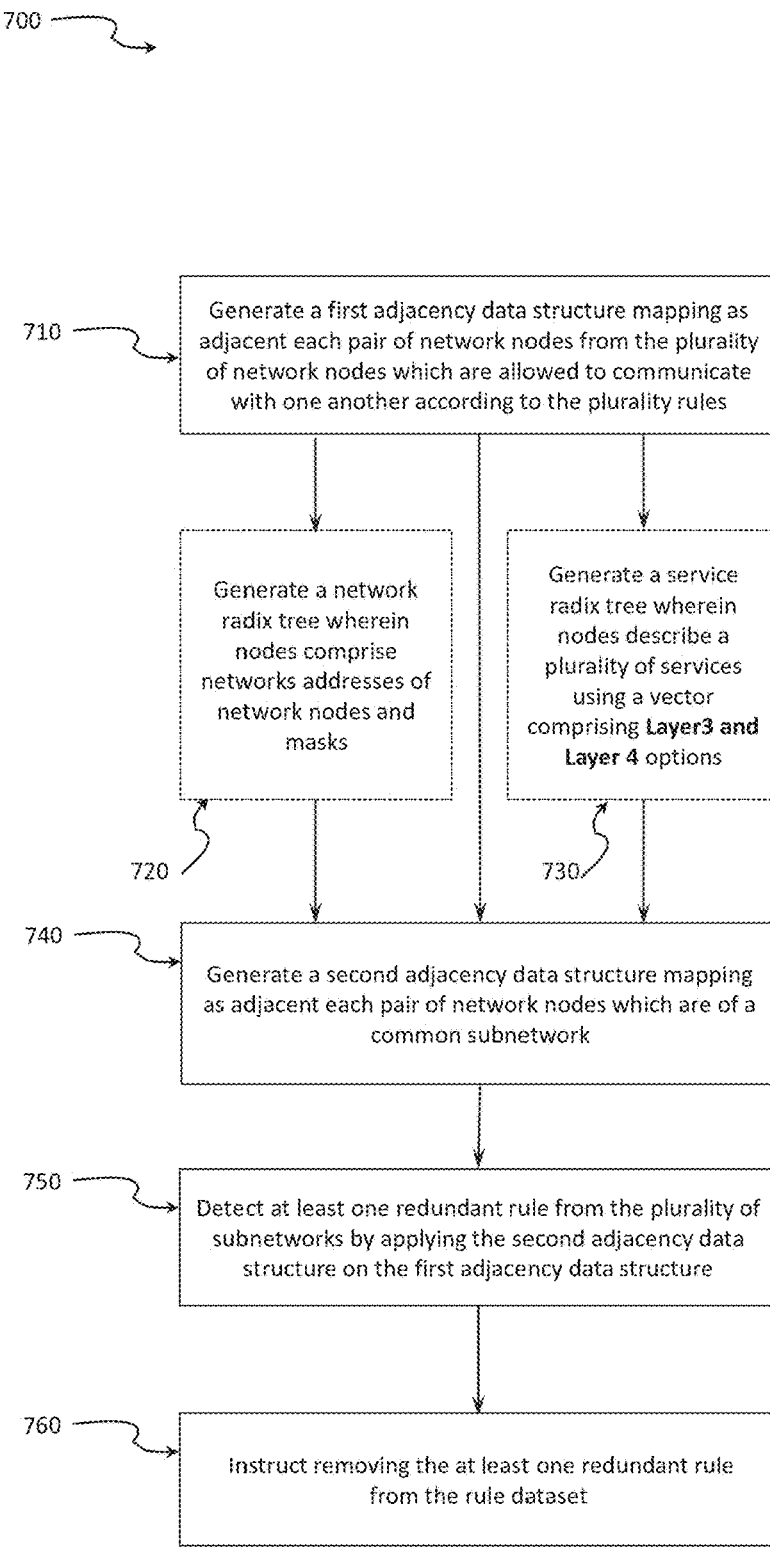
FIG. 7 shows a flowchart of an exemplary process for pruning the access control list, used for enforcing network security policies, according to some embodiments of the present disclosure.

Reference is now made to FIG. 7, which shows a flowchart of an exemplary process for pruning the access control list, used for enforcing network security policies, according to some embodiments of the present disclosure. The exemplary process 700 may be executed by the same system used for executing the process 600, however the data may be moved to another computing system, for example, to a virtual system on the cloud, a remote system and/or the likes. Alternatively, the process may be executed using another network node, for example, a compute server having larger memory. The process may be executed by a single system, however alternative implementations may split the execution between different systems. The process may be executed for example, by the firewall processor 106, or by the processor system 17 shown in FIGS. 1A and 1B. The process 700 may be executed routinely, for example, hourly, daily, weekly, or monthly. Additionally or alternatively, the process 700 may be executed after one or more policy updates. The process may be initiated either manually, for example by a system administrator or automatically, for example as a part of policy update flow, or by a scheduler such as Unix Cron daemon. Frequent executions of the process may help keeping the rule list as short as possible, at price of the temporary memory consumption, processing power usage, and communication bandwidth required for the process.

The exemplary process 700 starts by generating a first adjacency data structure mapping as adjacent each pair of network nodes from the plurality of network nodes, which are allowed to communicate with one another according to the plurality rules as shown in 710.

Figure 12:
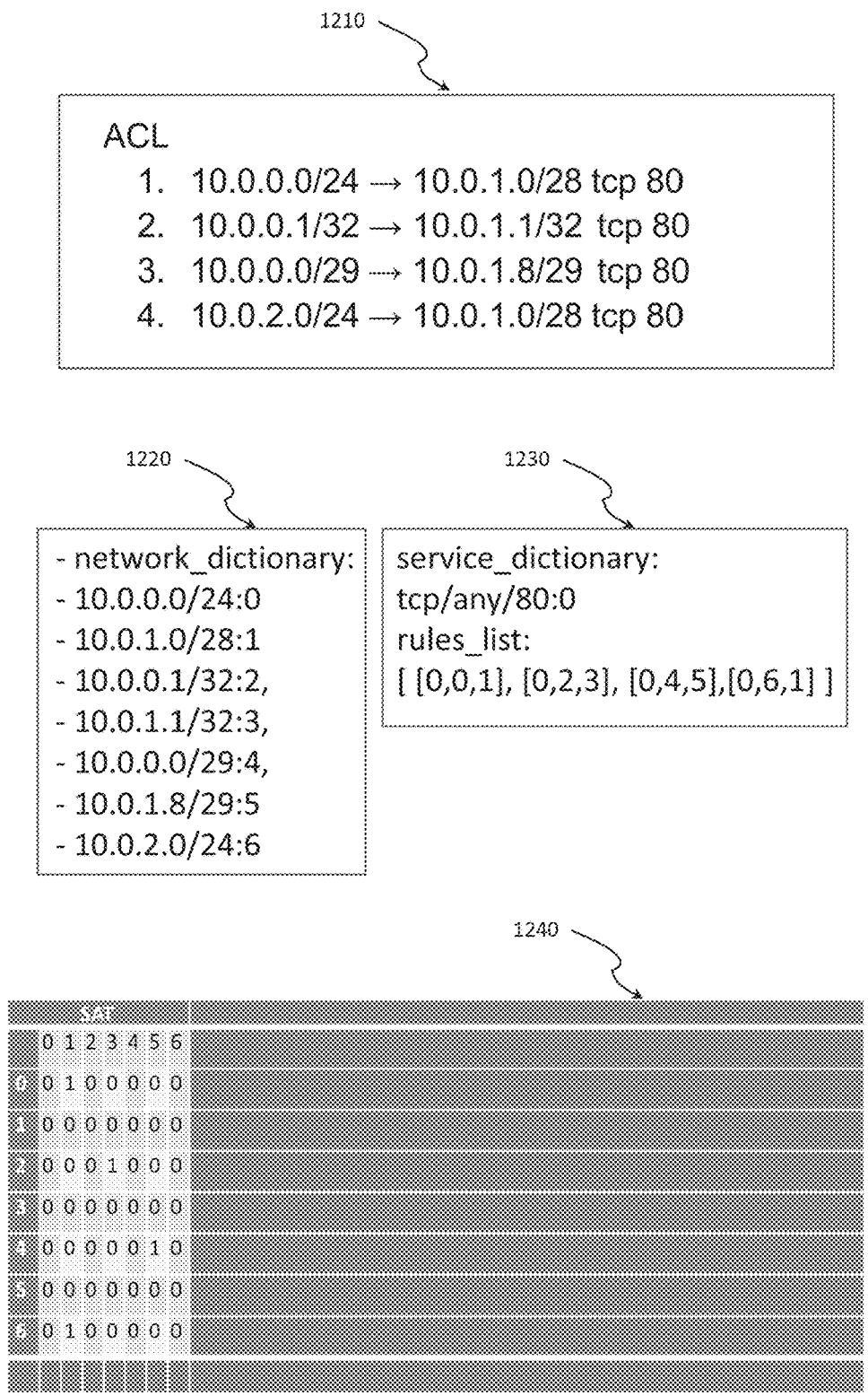
FIG. 12 shows three exemplary lists of rules and subnetworks, and an associated table representing the first adjacency data structure, according to some embodiments of the present disclosure.

The first adjacency data structure may be generated in various architectures. Optionally, the first adjacency data structure may be a tensor, for example, a three dimensional tensor. Optionally, one axis of the tensor is based on the source object identifier, another axis is based on the destination object identifier, and the third axis is based on the service. The service may be characterized by protocols, options, ports, service identifiers associated with other layers, and/or other properties, which characterize the communication. An exemplary slice of a three-dimensional first adjacency data structure is shown in FIG. 12. Alternatively, the first adjacency data structure may be a decision tree, a linked list, a dictionary, a graph, and/or the like. An exemplary, single service, graph first adjacency data structure is shown in FIG. 3.

The exemplary process 700 may comprise generating two radix trees, a network radix tree, as shown in 720 and a service radix tree as shown in 730. Alternative implementations may use other data structures for analyzing the network and/or service hierarchies.

Figure 8:
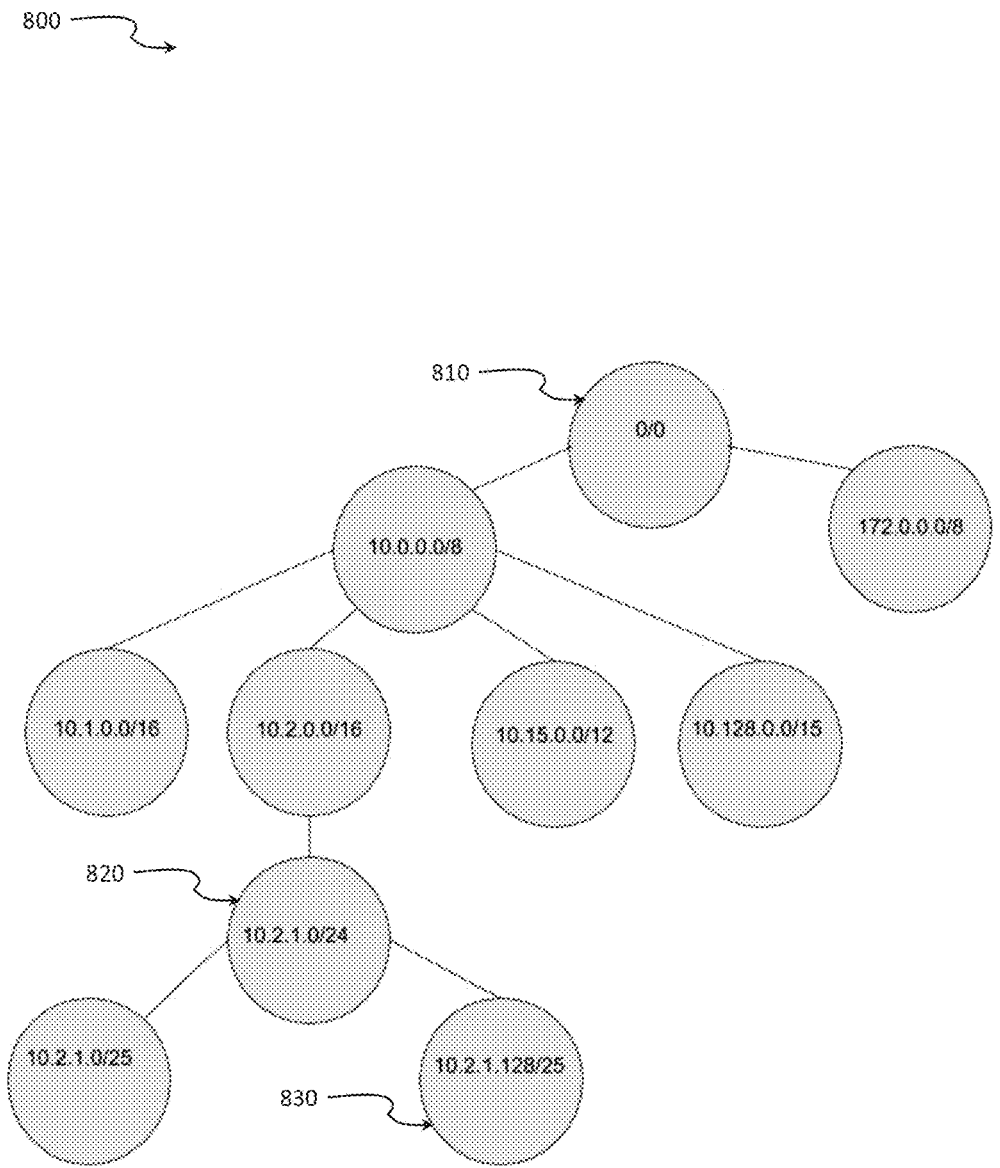
FIG. 8 shows an exemplary network radix tree, according to some embodiments of the present disclosure.

The network radix tree's nodes comprise networks addresses of network nodes and masks. The network radix tree is a hierarchical data structure based on addresses of network nodes, subnet masks, and/or other identifiers and groupings. A dictionary comprising network nodes and subnetworks mentioned in the rules may be used as an auxiliary data structure. An exemplary network radix tree is shown in FIG. 8.

Figure 10:
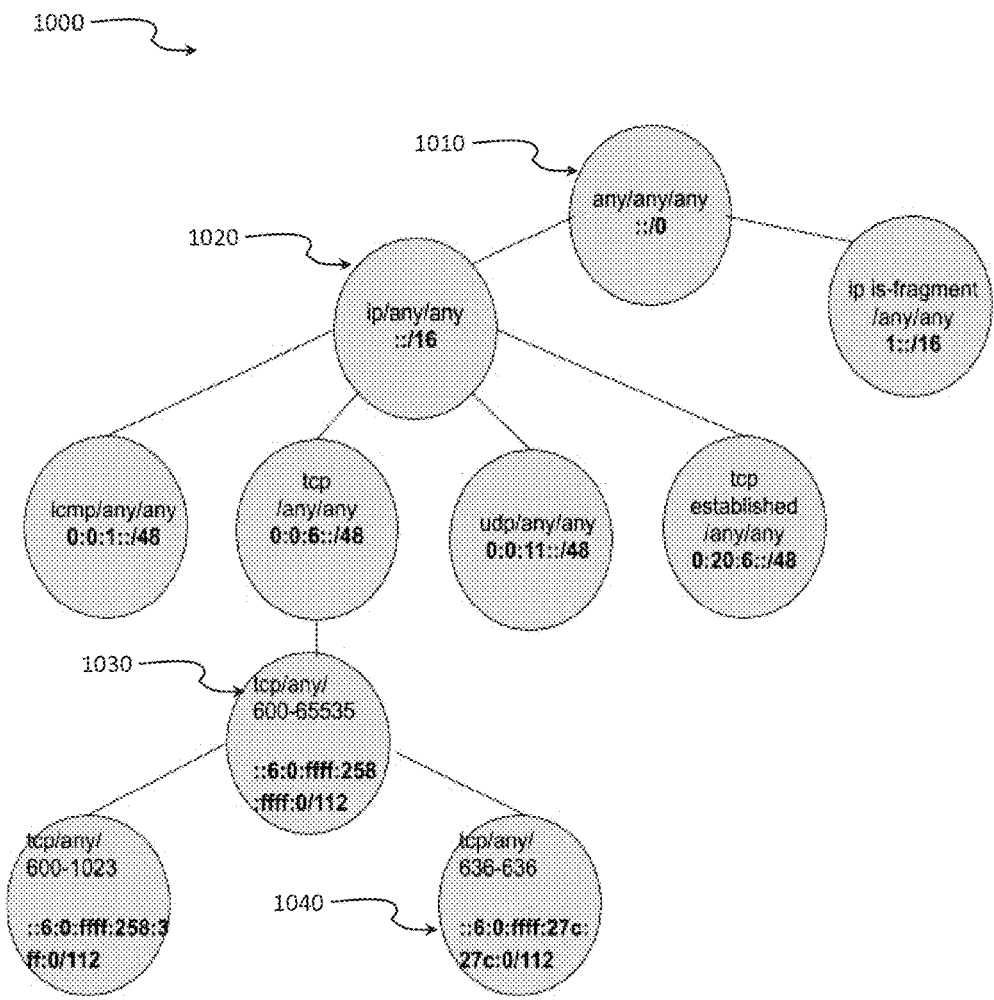
FIG. 10 shows an exemplary service radix tree, according to some embodiments of the present disclosure.

The service radix nodes describe a plurality of services using a vector comprising IP and TCP options. The service radix tree is a hierarchical data structure that may be based on different layers and levels of protocols, options, configurations, and/or the like. A dictionary comprising services, options, port ranges, and the likes, form one or more communication layers, and groups thereof mentioned in the rules may be used as an auxiliary data structure. An exemplary service radix tree is shown in FIG. 10.

The system executing the exemplary process 700 continues by generating a second adjacency data structure, mapping as adjacent each pair of network nodes, which are of a common subnetwork allowed to communicate using the associative service, as shown in 740. The generation of the second adjacency data structure may have the same shape and dimensions of the first adjacency data structure, or may be a slice corresponding to a slice of the first adjacency data structure.

As used herein, the term shadowing, and accordingly the verb shadow, refer to allowing a first group of network nodes to communicate with a second group of network node, using a third group of services, when there is at least one other, more specific rule, allowing one, some, or all of the first group of network nodes to communicate with one, some, or all of the second group of network nodes, using one, some, or all third group of services. The term shadowing refers to three subtypes of shadowing and combinations thereof. The shadowing subtypes are internal shadowing, service shadowing, and protocol shadowing. Internal shadowing refers to source internal shadowing, destination internal shadowing and combinations of both. Source internal shadowing refers to when the more specific rule allows communication from one or some of the first group of network nodes to communicate with one, some, or all of the second group of network nodes, using one, some, or all third group of services. Destination internal shadowing refers to when the more specific rule allows communication from one, some, or all of the first group of network nodes to communicate with one or some of the second group of network nodes, using one, some, or all third group of services.

Protocol shadowing refers to when a general rule allows at least one network node to communicate with at least one other network node using a lower layer protocol and the at least one shadowed, redundant rule allows the at least one network node to communicate with the at least one other network node, using one or more upper layer protocol. Service shadowing refers when a more general rule allows at least one network node to communicate with at least one other network node, using a transport layer port range which includes the transport layer port range of at least one other, shadowed, and thus redundant rule.

Internal shadowing is shown in FIG. 8, and an example is presented in FIG. 12 and FIG. 13. Service and protocol shadowing are shown in FIG. 10. Alternative implementations may allow communication by default and specify rules forbidding a group of network nodes to communicate with another group of network node, using a group of services, and shadowing may accordingly refer to a more general rule forbidding communication forbidden by a more specific rule.

The second adjacency data structure indicates which combinations of source object and destination object may be allowed to communicate suing one or more services in accordance with general rules. The second adjacency data structure may be used to detect shadowed, more specific rules, allowing the same combinations of source object, destination object, and service. The generation of the second adjacency data structure may be based on auxiliary data structures, for example the network radix tree and the service radix tree, however other or no intermediate data structures may be generated.

The second adjacency data structure may be characterized by a structure and dimensions, which are compatible with the first adjacency data structure, however some implementations may characterize different dimensions and forms for the adjacency data structures. Exemplary code for populating a slice of a second adjacency data structure is shown in FIG. 11.

Following the construction of the adjacency data structures, the system executing the exemplary process 700 continues by detecting at least one redundant rule from the plurality of subnetworks by applying the second adjacency data structure on the first adjacency data structure, as shown in 750, in order to generate a list of rules which may be removed, or alternatively a shorter list or rules, which allows the same security and functionality.

The detection of redundant rules may be based on a matching between the first adjacency data structure and the second adjacency data structure. Examples of code executing detection of redundant rules are shown in FIG. 14. Alternatively, for example, when the adjacency data structures are trees the matching between the data structure may comprise tree transversal.

Following the completion of 750, the system executing the exemplary process 700 concludes by instructing removing the at least one redundant rule from the rule dataset, as shown in 760. The removing may be executed by instructing one or more networks nodes maintaining an access control list to remove a rule, by generating a new list of rules and sending it to designated routers, switches, gateways, and/or the likes, or by combining these methods. The system may submit the updated rule list and/or the removal instruction through data and/or control channels to network elements such as switches, pod switches (e.g. 236 in FIG. 2A), routers, gateway appliances, server computer systems, firewall computer appliances, such as a firewall (e.g. 216 in FIG. 2A), a database firewall (e.g. 248 in FIG. 2A), and/or devices comprising similar computing resources and network connections. The system may update all the devices simultaneously through multicast, consecutively, or gradually to allow other communication during the updating, since the updated rules instruct forwarding and blocking the same packets, however using fewer resources such as designated context accessible memory.

Reference is now made to FIG. 8, which shows an exemplary network radix tree, according to some embodiments of the present disclosure. The at least one hierarchical data structure may comprises a network radix tree, wherein nodes comprise networks addresses of network nodes and masks.

The network radix tree may be generated at 720 as shown in FIG. 7. The network radix tree may help detecting internal shadowing, wherein at least one redundant rule allows at least one network node to communicate with at least one other network node, and at least one other rule allows the common subnetwork comprising the at least one network node to communicate with the at least one other network node, the at least one network node to communicate with a subnetwork comprising the other network node, or both.

Each node in the exemplary network radix tree 800 has two numbers separated by a slash. The one or more numbers on the left is an address, i.e. an IP address characterizing the node or the subnetwork, and the number on the right is a subnetwork mask, counting the number of bits that must match, while the other bits are don't care and not compared when applying the associated rules.

The root node 810 has 0 bits and covers the entire network. The exemplary node interim tree node 820 has 24 mask bits. Since each of the four numbers separated by a point represents 8 bits, the subnetwork mask covers the addresses matching the three left numbers, or the range 10.2.1.0 to 10.2.1.255. The exemplary leaf node 830 has 25 mask bits and covers the range 10.2.1.128 to 10.2.1.255.

The radix tree, or other representation graph used for internal shadowing related mapping, may be constructed by passing through the rules or by a dictionary based on the node addresses, subnetworks, groups, identifiers, and/or the likes, which appear either as source, as destination, or both in the rules.

Figure 9:
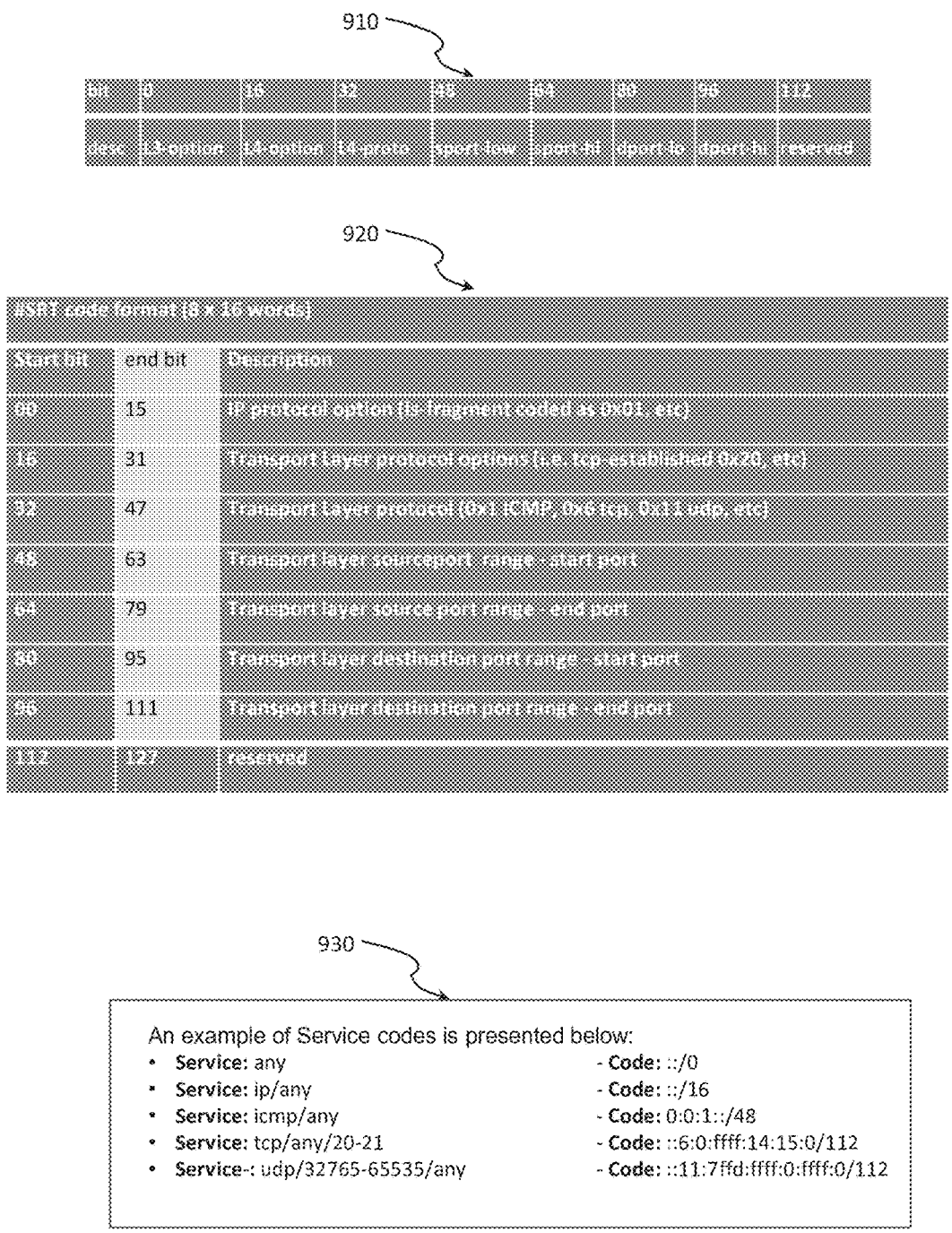
FIG. 9 shows three tables showing an exemplary structure of service radix tree and an example of service codes, according to some embodiments of the present disclosure.

Reference is now made to FIG. 9, which shows three tables showing an exemplary structure of service radix tree and an example of service codes, according to some embodiments of the present disclosure. The at least one hierarchical data structure may, additionally or alternatively to the network radix tree, may comprises a service radix tree.

The service radix tree may help detecting protocol and service shadowing. Protocol shadowing refers to redundant rules which allow at least one network node to communicate with at least one other network node, using an upper layer protocol (e.g. ICMP, TCP, UDP) service and at least one other rule allows the at least one network node to communicate with the at least one other network node using a lower layer protocol (e.g. IP) service. Service shadowing refers to redundant rules which allow at least one network node to communicate with at least one other network node, using a transport layer port range included in a transport layer port range of at least one other rule, allowing the at least one network node to communicate with the at least one other network node. Shadowing by other properties, for example, transport layer options may also be detected using the service radix tree.

The table 910 shows an exemplary field partition for the data associated with nodes of a service radix tree. The top row indicates the start bit, while the bottom row is a short description of the field. The table 920 shows more details about the exemplary field partition.

The leftmost column is the start bit, the middle column is the end bit, and rightmost is the description.

The most significant bits, 0-15 are allocated to IP protocol option, for example, is-fragment, which is coded as 0x01.

The next most significant bits, 16-31 are allocated to transport layer protocol options, for example TCP-established, which is coded as 0x20.

The next significant bits, 32-47 are allocated to transport layer protocol code, for example, 0x1 for ICMP, 0x6 for TCP, and 0x11 UDP.

The next bits, 48-79 are allocated transport layer source port range, first the start port, second the end port.

The next less significant bits, 80-111 are allocated transport layer destination port range, first the start port, second the end port.

The least significant bits, 112-127 are reserved and not used in this exemplary field partition.

It should be emphasized that this field structure is exemplary. There may be significance to allocating the more significant bits to lower layer protocol, while using less significant bits for higher layer protocols or options, as lower layer protocols are more general than the higher-level protocols implemented over them. However, the order of the port ranges may vary. Implementations of this disclosure may use the reserved field for metadata, options from higher layer protocols, and/or the likes.

The table 930 contains an exemplary list of service codes, in accordance with the field partition of the service radix tree shown in 910 and 920. The exemplary services refer to ranges of ports and services. The code format comprises one or more numbers on the left of the slash and a mask, a bit count of the valid bits to match on the right.

For example, the third exemplary rule refers to all ICMP services, the code will start with the three 16 bit numbers 0, 0 and 1, and since the mask refers only to the first three numbers, there is no need to care about the content of the other numbers. The fourth exemplary rule refers to any TCP source port to destination ports 20-21 (decimal number). The code may not care about IP options, comprise the TCP code 6, the port range 0 to 0xFFFF (hexadecimal number), and the destination port range 0x14 to 0x15. The mask indicates 112 bits are significant.

Reference is now made to FIG. 10, which shows an exemplary service radix tree, according to some embodiments of the present disclosure. The at least one hierarchical data structure may comprises, alternatively or additionally to the network radix tree, a service radix tree, wherein nodes comprise masks and descriptors based on protocol, protocol options, port ranges, and/or the likes.

The nodes of the service radix tree may be characterized by a descriptor as described in FIG. 9, however other grouping taxonomies and identifiers, which may be based protocol, option, port and/or the like may be used.

The service radix tree may be generated at 730 as shown in FIG. 7. Each node in the exemplary service radix tree 1000 is described by a few keywords, number ranges or acronym separated by slashes, a list of numbers in bold, separated by colons, and another number in bold, separated by a slash. The words, abbreviations or acronyms may describe protocol names, or options. The keyword 'any' refers to rules, which apply to all the protocols or options, applicable to the associated layer. The ranges describe port ranges. The one or more numbers in bold on the left of the slash are descriptor fields, which may be empty if the value is don't care, and the number on the right is a mask, counting the number of bits that must match, while the other bits are don't care and not compared when applying the associated rules.

The root node 1010 has any on all the fields, and correspondingly, 0 mask bits since it covers the entire set of protocols, options, port ranges, and the like, which are supported by the network.

The exemplary interim tree node 1020 has 16 mask bits, since each field in this exemplary descriptor is of 16 bits and the node covers, and thus may shadow, all IP services. Accordingly, the first field, specifying the IP protocol may be checked for matching.

The other exemplary interim tree node 1030 covers the port ranges 600 to 65535 (decimal) for all TCP options, and thus has 112 bits for matching the protocol and port ranges. The exemplary leaf node 1040 covers all TCP options for a smaller port range, and thus also has 112 mask bits, however the port is specific, and thus the port range has the same number as start port and end port. Note that the numbers representing the port ranges are decimal, however hexadecimal when represented as fields in the service radix tree code descriptor.

The radix tree, or other representation graph used for service and/or protocol shadowing related mapping, may be constructed by passing through the rules or by a dictionary based on protocols, options, services, port ranges, and/or the like.

Reference is now made to FIG. 11, which shows two exemplary code segments, used for the construction of the first adjacency data structure and the second adjacency data structure, according to some embodiments of the present disclosure.

The first adjacency data structure may be a service adjacency tensor (SAT) in a three-dimensional (3D) space, which comprises a plurality of vectors. Vectors of the plurality of vectors may represent respective rules for individual network nodes of a set of network nodes allowed to communicate in a network using one or more services. The Python code segment 1110 is an exemplary method of generating the 3-dimensional matrix, array, or tensor, which may be referred to as the service adjacency tensor (SAT).

It should be noted that Python was chosen for the exemplary code since it has effective libraries such as Numpy, and enables concise coding and rapid prototyping. It should be emphasized that the disclosure is not limited to this programming language, and may be implemented in other languages such as C, C++, Java, and other libraries, including proprietary libraries or machine specific code libraries may be used.

The SAT may be represented as a list of 3-dimensional vector in the space (service, source_network, destination_network), or a 3D matrix containing all the possible rules in a given space.

For each rule of the ACL such as Network n1 is allowed to talk with network n2 using a service s, there will be a corresponding non-zero element (s, n1, n2) of the service adjacency tensor.

The second adjacency data structure may be a slice in the service space of the SAT, when each slice of the SAT in the service space may be referred to as service adjacency matrix (SAM), and comprise a plurality of vectors. Vectors of the plurality of vectors may represent respective rules for the network nodes from the plurality of subnetworks to communicate in a network using the one or more services corresponding to the slice.

The Python code segment 1120 is an exemplary method of generating the second adjacency data structure. The code generates a slice of the second adjacency data structure, formed similarly to the service adjacency tensor, and may also referred to as a conjugate service adjacency tensor. It should be noted that the term conjugate is used as a structural analogy, and does not imply the calculation involve phase or complex numbers. The slice is generated for one or more services, and marks elements, corresponding to network nodes for which a rule for a broader subnetwork allows communication to one or more network nodes.

The service adjacency conjugate may be a matrix containing "0s" for all he source and destination sub-networks of a given rule, and only the source and destination supernets of a given rule will have a "1" in the corresponding element of the second adjacency data structure.

Reference is now made to FIG. 12, which shows three exemplary lists of rules and subnetworks, and an associated table representing the first adjacency data structure, according to some embodiments of the present disclosure.

The at least one hierarchical data structure may be further based on a dictionary, containing an indexed list of the plurality of network nodes and the plurality of subnetworks, represented in the plurality of rules.

An exemplary list of rules of an access control list is shown in 1210. As this access control list contains four rules, allowing communication using the same service, two of which, the second and the third, are shadowed by the internally shadowed by the first, and thus are redundant. The exemplary implementation of the disclosure generates a dictionary, including all the seven network nodes and subnetworks mentioned in the rules, as shown in 1220. The exemplary implementation may further generate a network radix tree containing all the networks, and since the service dictionary for this exemplary list of rules includes only one element, the service radix tree may be also a single element. The list of rules, referring to items of network dictionary, and the service dictionary are shown in 1230.

The service adjacency tensor, as shown in 1240, has a 1×7×7 element, corresponding to one service and a list of seven nodes and subnetworks.

Reference is now made to FIG. 13, which shows two exemplary tables of second adjacency data structure and its application, and a generated ruleset, according to some embodiments of the present disclosure. The tables and rules are exemplary and match the exemplary tables and lists shown in FIG. 12.

The second adjacency data structure may be based on hierarchical data structures such as the network radix tree and service radix tree, based on the plurality of subnetworks present in the network dictionary and service dictionary.

The exemplary implementation may generate the second adjacency data structure as shown in 1310, for the exemplary access control list (ACL) rules shown in FIG. 12.

Applying the second adjacency data structure on the first adjacency data structure may done by an elementwise operator, for example elementwise and, as shown in 1320, the two overlapping rules have been pruned from the new SAT=SAT & SAT*

The new exemplary ruleset is therefore: [[0,0,1], [0,6,1]] and the corresponding access control list is shown in 1330.

It should be noted that alternative forms and operations for the second adjacency data structure and its application on the first adjacency data structure will be apparent to those skilled in the art, and alternatives, modifications and variations such as using k-d trees, using or operation with negated variants of the adjacency data structures, and the like may be applied.

Reference is now made to FIG. 14, which shows two exemplary code segments, used for the application of the second adjacency data structure and the application of the service radix tree in the construction of the second adjacency data structure, according to some embodiments of the present disclosure.

The second adjacency data structure may be based on a service radix tree wherein nodes describe a plurality of services using a vector comprising Internet protocol (IP) options and at least one word selected from of upper layers protocol type, protocol options, source port numbers, and destination port numbers.

Protocol pruning may be based on the service radix tree, and comprise identifying the root-service, and creating the second adjacency data structure, or conjugate service adjacency matrix (SAM) for the root service, as SAM*root. The root conjugate may contain a "1" only on the cells corresponding to the destination and source super networks for each rule. Followingly, it may comprise calculating the new SAMchild, an elementwise and of SAMchild and SAM*root, each child service of the root. An exemplary Python code for protocol or service pruning is shown in 1410.

Internal Pruning may comprise identifying the service adjacency matrix, which may be a SAT slice, for each service. Followingly, it may comprise creating the conjugate service adjacency matrix (SAM) for the current service=SAM*service. The service conjugate may contain a "1" only on the cells corresponding to the biggest networks for each rule. Further followingly, the internal pruning may comprise calculate the new, SAMservice, as an elementwise and of SAMservice and SAM*service, for one or more child services of the root.

Service overlapping pruning may be based on the service radix tree, and start with identifying the parent-services, which are the services whose range includes other ranges. The pruning may continue by creating the conjugate service adjacency matrix for the parent services, which may be referred to as SAM*parent. The parent conjugate will contain a "1" only on the cells corresponding to the super, source and destination, networks for each rule. The pruning may continue by calculating the new SAMchild as an elementwise and of SAMchild and SAM*parent, for each child service of the root. An exemplary Python code for protocol or service pruning is shown in 1410.

It should be noted that alternative forms and operations of the pruning will be apparent to those skilled in the art, and alternatives, modifications and variations such as using graphs, trees, using or operation with negated variants of the adjacency data structures, and the like may be applied.

Reference is now made to FIG. 15, which shows two experiment results of a process for pruning the access control list, used for enforcing network security policies, according to an exemplary embodiment of the present disclosure.

Two experiments using two exemplary real-world access control lists, named acl1 and acl2 have been used to assess the performances in a real-world scenario. The experiments included generating a tensor-version of a real-world access control lists developed to render a real-world access control as a Numpy tensor The results of pruning acl1, using a python3 implementation, by the command line: time python3 acl_prune.py-lc acl1-pr-pp, are shown in 1510.

The results of pruning acl2, using the python3 implementation, by the command line: time python3 acl_prune.py-lc acl2-pr-pp, are shown in 1520.

Analysis of the Result shows that the application of the proposed methodology to a real-world access control list shows that processing a real-world access control list takes about 30 minutes on an EC2 instance. The tool detects an average of 5% of the rules shadowed.

Deciding whether or not these numbers are significant, depends on the pressure to optimize the ternary content-addressable memory (TCAM) occupation and the amount of computing resources such as processing and memory, which may be assigned to perform ACL pruning.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant communication protocols, port ranges, data structures, programming languages, programming methods, network and computing devices will be developed and the scope of the terms like system, device, protocol, port, and instructions are intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A computing system for enforcing network security policies, comprising:
   a memory storing a rule dataset comprising plurality of rules conditioning communication between a plurality of network nodes of a plurality of subnetworks; and
   a processor operable to:
   generate a first adjacency data structure mapping as adjacent each pair of network nodes from the plurality of network nodes which are allowed to communicate with one another according to the plurality rules;
   generate a second adjacency data structure mapping as adjacent each pair of network nodes which are of a common subnetwork;
   detect at least one redundant rule from the plurality of subnetworks by applying the second adjacency data structure on the first adjacency data structure, wherein the applying the second adjacency data structure on the first adjacency data structure is done by an elementwise operator, and the second adjacency data structure is based on at least one hierarchical data structure, based on the plurality of subnetworks; and
   instruct removing the at least one redundant rule from the rule dataset.

2. The computing system of claim 1, wherein the at least one redundant rule allows at least one network node to communicate with at least one other network node, using an upper layer protocol (e.g. ICMP, TCP, UDP) service and at least one other rule allows the at least one network node to communicate with the at least one other network node using a lower layer protocol (e.g. IP) service.

3. The computing system of claim 1, wherein the at least one redundant rule allows at least one network node to communicate with at least one other network node, using a transport layer port range included in a transport layer port range of at least one other rule, allowing the at least one network node to communicate with the at least one other network node.

4. The computing system of claim 1, wherein the at least one redundant rule allows at least one network node to communicate with at least one other network node, and at least one other rule allows the common subnetwork comprising the at least one network node to communicate with the at least one other network node.

5. The computing system of claim 1, wherein the at least one hierarchical data structure is further based on a dictionary, containing indexed list of the plurality of network nodes and the plurality of subnetworks, represented in the plurality of rules.

6. The computing system of claim 1, wherein the at least one hierarchical data structure comprises at least one network radix tree wherein nodes comprise networks addresses of network nodes and masks.

7. The computing system of claim 1, wherein the applying the second adjacency data structure on the first adjacency data structure is done by an elementwise operator, and the second adjacency data structure is based on a service radix tree wherein nodes describe a plurality of services using a vector comprising Internet protocol (IP) options and at least one word selected from of upper layers protocol type, protocol options, source port numbers, and destination port numbers.

8. The computing system of claim 1, wherein the first adjacency data structure is a service adjacency tensor (SAT) in a three-dimensional (3D) space, the SAT comprising a plurality of vectors, each vector of the plurality of vectors represents respective rules for individual network nodes of a set of network nodes allowed to communicate in a network using one or more services.

9. The computing system of claim 8, wherein the second adjacency data structure being a slice in the service space of the SAT, and comprising a plurality of vectors, each vector of the plurality of vectors represents respective rules for the network nodes from the plurality of subnetworks to communicate in a network using the one or more services corresponding to the slice.

10. The computing system of claim 8, wherein each vector of the plurality of vectors represents a rule of a plurality of rules, and the plurality of rules belongs to corresponding network policies for communicating in a computer network.

11. The computing system of claim 8, wherein the processor comprises a plurality of entries, each entry comprising a source object from the set of objects and a destination object from the set of objects, and to generate the service adjacency tensor, and the processor is further operable to generate the service adjacency tensor such that individual entries the plurality of entries include a value of one if and only if a source object for the individual entries is allowed to communicate with a destination object for the individual entries using a given service.

12. The computing system of claim 1, wherein the processor is operable to control enforcement of the network security policies.

13. The computing system of claim 12, wherein the processor is operable to: inspect one or more data packets received by the network interface; and permit forwarding of the one or more data packets if a source object indicated by the one or more data packets is permitted to: communicate with a destination object indicated by the one or more data packets.

14. The computing system of claim 1, wherein the computing system is a switch, a router, a gateway appliance, a firewall computer appliance, or a server computer system.

15. The computing system of claim 1, wherein each of the respective rules comprises a source object that is allowed to communicate with a destination object using a service.

16. The computing system of claim 1, wherein the processor is further operable to generate a network service graph comprising a plurality of objects and edges representing communications between the plurality of objects using a service.

17. A computer implemented method for enforcing network security policies, according to a rule dataset comprising plurality of rules conditioning communication between a plurality of network nodes of a plurality of subnetworks, the method comprising:
   generating a first adjacency data structure mapping as adjacent each pair of network nodes from the plurality of network nodes which are allowed to communicate with one another according to the plurality rules;
   generating a second adjacency data structure mapping as adjacent each pair of network nodes which are of a common subnetwork;
   detecting at least one redundant rule from the plurality of subnetworks by applying the second adjacency data structure on the first adjacency data structure, wherein the applying the second adjacency data structure on the first adjacency data structure is done by an elementwise operator, and the second adjacency data structure is based on a at least one hierarchical data structure, based on the plurality of subnetworks; and instructing removing the at least one redundant rule from the rule dataset.

18. One or more non-transitory computer-readable media (NTCRM) comprising instructions of enforcing network security policies, according to a rule dataset comprising plurality of rules conditioning communication between a plurality of network nodes of a plurality of subnetworks, wherein execution of the instructions by one or more processors of a computing system is to cause a computing system to:

generate a first adjacency data structure mapping as adjacent each pair of network nodes from the plurality of network nodes which are allowed to communicate with one another according to the plurality rules;

generate a second adjacency data structure mapping as adjacent each pair of network nodes which are of a common subnetwork;

detect at least one redundant rule from the plurality of subnetworks by applying the second adjacency data structure on the first adjacency data structure, wherein the applying the second adjacency data structure on the first adjacency data structure is done by an elementwise operator, and the second adjacency data structure is based on a at least one hierarchical data structure, based on the plurality of subnetworks; and instruct removing the at least one redundant rule from the rule dataset.

\* \* \* \* \*